(12) United States Patent
Ohsato

(10) Patent No.: US 8,479,584 B2
(45) Date of Patent: Jul. 9, 2013

(54) TEMPERATURE COMPENSATION METHOD FOR FORCE SENSOR AND FORCE SENSOR

(75) Inventor: Takeshi Ohsato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 221 days.

(21) Appl. No.: 13/092,343

(22) Filed: Apr. 22, 2011

(65) Prior Publication Data

US 2011/0259111 A1  Oct. 27, 2011

(30) Foreign Application Priority Data

Apr. 23, 2010  (JP) ................................ 2010-099487

(51) Int. Cl.
  *G01B 7/16*  (2006.01)
(52) U.S. Cl.
  USPC ............................................. 73/766; 73/760
(58) Field of Classification Search
  USPC .......................................... 73/760, 765, 766
  See application file for complete search history.

(56) References Cited

U.S. PATENT DOCUMENTS

| | | | | |
|---|---|---|---|---|
| 3,967,188 A | * | 6/1976 | Spencer ........................ | 323/367 |
| 4,301,807 A | * | 11/1981 | Mentelos ...................... | 600/354 |
| 4,437,164 A | * | 3/1984 | Branch, III ..................... | 702/86 |
| 4,858,145 A | * | 8/1989 | Inoue et al. ..................... | 702/41 |
| 6,973,837 B2 | * | 12/2005 | Barnett ........................... | 73/765 |
| 7,302,357 B2 | * | 11/2007 | Ausserlechner et al. ..... | 702/107 |
| 7,490,524 B2 | * | 2/2009 | Ohsato et al. ............. | 73/862.629 |
| 7,536,922 B2 | * | 5/2009 | Sakurai et al. ........... | 73/862.041 |
| 7,703,340 B2 | * | 4/2010 | Sakurai et al. ........... | 73/862.044 |
| 2009/0325205 A1 | * | 12/2009 | Fujii et al. ........................ | 435/14 |

FOREIGN PATENT DOCUMENTS

JP  11-183273  7/1999

* cited by examiner

*Primary Examiner* — Max Noori
(74) *Attorney, Agent, or Firm* — Squire Sanders (US) LLP

(57) ABSTRACT

There are provided a temperature compensation method for a force sensor and the force sensor which can perform temperature compensation in not only the steady range where the output by the force sensor is stable but also the transient range where the output is unstable. The force sensor temperature compensation method of the present invention eliminates the effect of an environmental temperature from a sensor output value indicating the output value by the force sensor in the transient range where the output by the force sensor is unstable or in the steady range where the output is stable, and includes a preparation step of obtaining the varying pattern of a monitoring output value indicating the environmental temperature in the transient range before the force sensor is measuring an external force, and a correction step of estimating a varying pattern based on a change rate of the monitoring output value while the force sensor is measuring the external force, and of correcting a sensor output value using a correction value obtained based on the estimated varying pattern.

17 Claims, 19 Drawing Sheets

FIG.1A
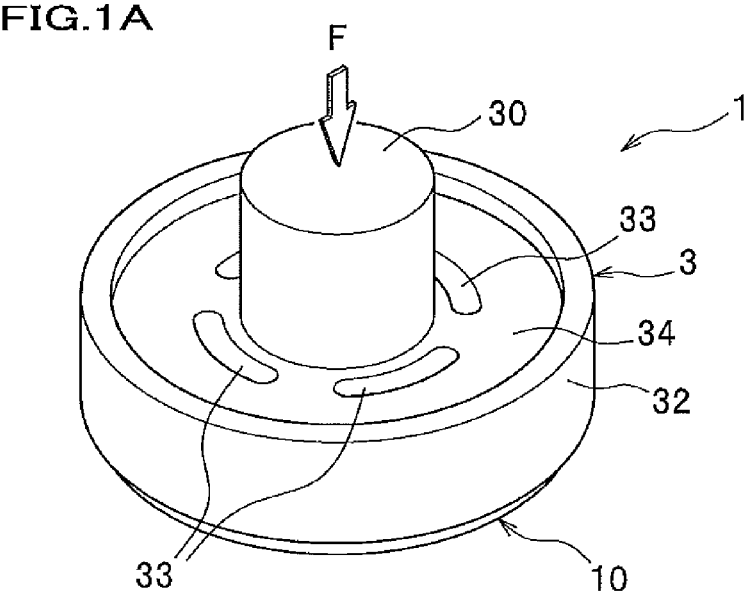
FIG.1B
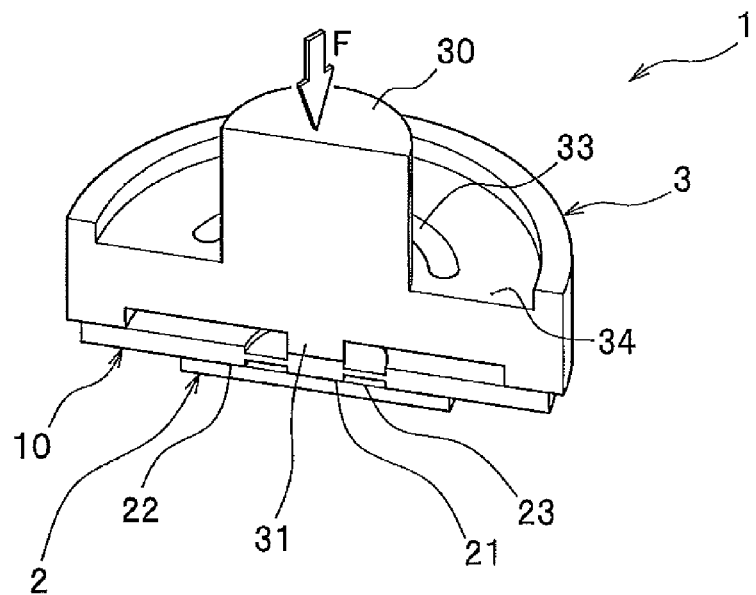
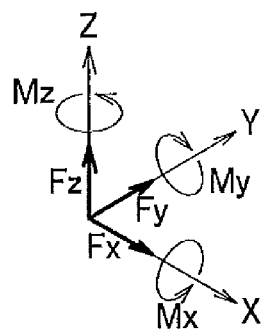

FIG.9A  Fx applied
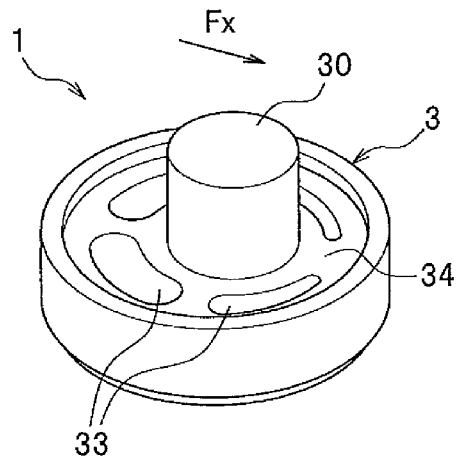
FIG.9B  Fz applied
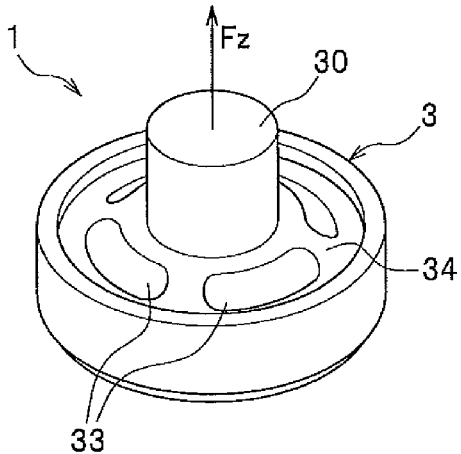
FIG.9C  My applied
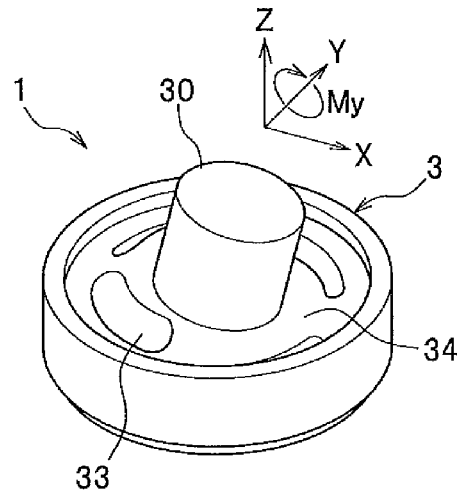
FIG.9D  Mz applied
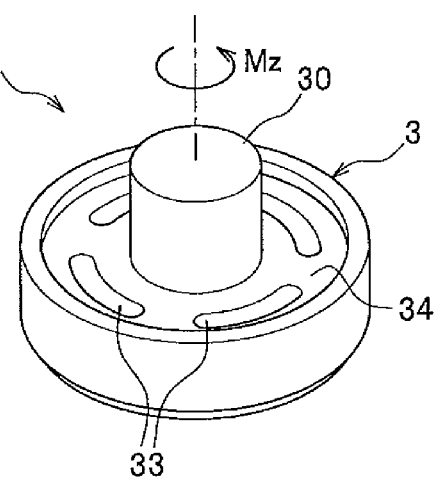
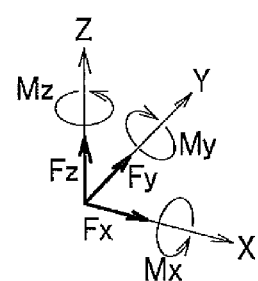

FIG.19A  Right after energized
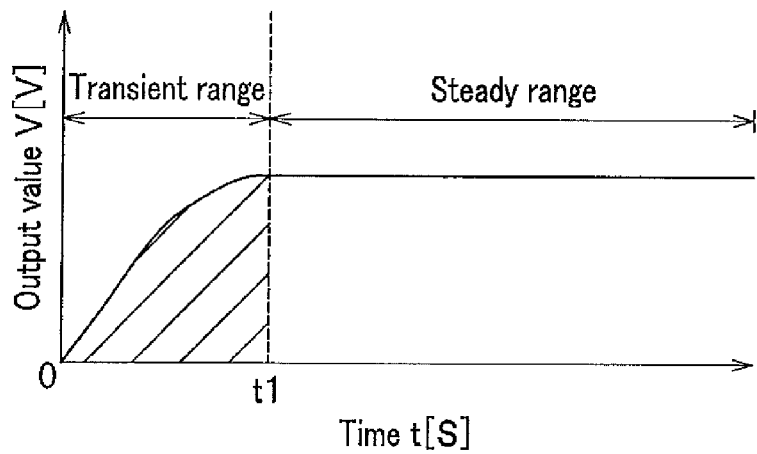
FIG.19B  Rapid heating
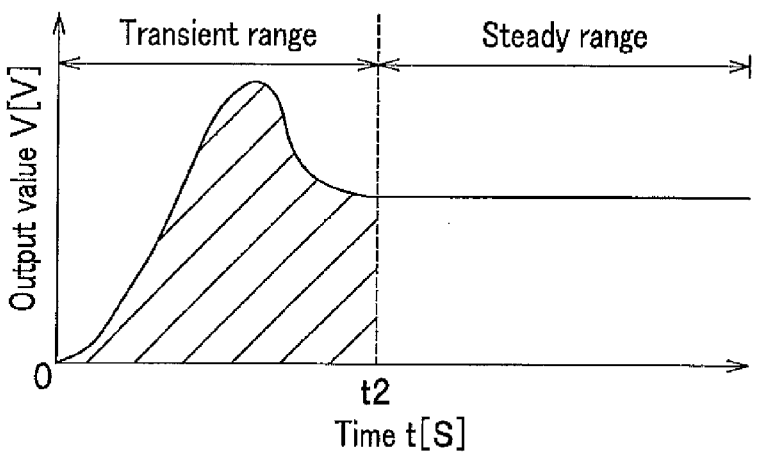
FIG.19C  Rapid cooling
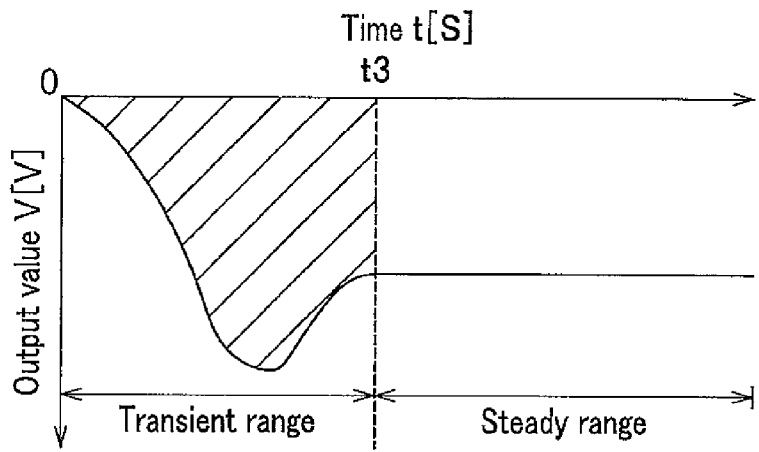

TEMPERATURE COMPENSATION METHOD FOR FORCE SENSOR AND FORCE SENSOR

CROSS REFERENCE TO RELATED APPLICATION

The application claims the foreign priority benefit under Title 35, United States Code, Section 119(a)-(d) of Japanese Patent Application No. 2010-099487, filed on Apr. 23, 2010, the contents of which are hereby incorporated by reference.

BACKGROUND OF THE INVENTION

1. Field of the Invention

The present invention relates to a temperature compensation method for a force sensor that measures external force through resistive elements and the force sensor.

2. Description of the Related Art

In the field of automatic operating machines, such as machine tools and robots, a force is applied to a work target or an external force is received through a work operation. In this case, it is necessary for an automatic operating machine to detect external force and moment (moment of force) applied thereto, and to perform a control in accordance with the detected force and moment. In order to perform such a control highly precisely in accordance with detected force and moment, it is necessary to precisely detect a force from the exterior (an external force) and a moment.

Hence, various kinds of force sensors are proposed so far. Conventionally known force sensors employ a fundamental configuration in which a plurality of strain detecting resistive elements are provided at deformation portions of an elastic body which elastically deforms in accordance with an external force. When an external force is applied to the elastic body of a force sensor, the plurality of strain detecting resistive elements output electrical signals in accordance with the level of deformation (a stress) of the elastic body. Based on such electrical signals, forces, etc., of equal to or greater than two components applied to the elastic body can be detected.

An example of such a force sensor is a hexaxial force sensor. Such a hexaxial force sensor divides an applied force into stress components (forces: Fx, Fy, and Fz) in individual axial directions of three axes (X axis, Y axis, and Z axis) of a Cartesian coordinate system and torque components (moments: Mx, My, and Mz) in individual axial directions, and detects those as hexaxial components.

Such a force sensor utilizes a characteristic such that the strain detecting resistive element deforms upon application of an external force and the resistance value of such element changes, and detects a change in the output voltage based on a change in the resistance value of the strain detecting resistive element, thereby measuring the magnitude of a force or a moment. The strain detecting resistive element used in the force sensor has a temperature dependency which changes the resistance value depending on an environmental temperature. Hence, when the environmental temperature changes while the force sensor is in operation, the output voltage (the output value) becomes varying even though no external force is applied, so that measurement becomes imprecise.

Accordingly, the temperature compensation circuit of the sensor disclosed in Japan Patent No. 3352006 (see claim 1) includes a temperature sensor that changes the resistance value depending on an environmental temperature, an offset correction circuit that outputs a correction value for offset correction depending on the environmental temperature detected by the temperature sensor, and a sensitivity correction circuit that outputs a correction value for sensitivity correction depending on the environmental temperature detected by the temperature sensor. By correcting the sensor output value with a correction value for offset correction and a correction value for sensitivity correction, an output value having the effect of the environmental temperature eliminated through mainly hardware processes is obtained.

However, the temperature compensation circuit of the sensor disclosed in Japan Patent No. 3352006 can eliminate the effect of the environmental temperature in a steady range where the sensor output is stable, but is unable to eliminate the effect of the environmental temperature in a transient range where the sensor output is unstable. That is, in a transient range, such as when the temperature of the temperature sensor rapidly increases right after the sensor is energized as shown in FIG. 19A, when a high-temperature object contacts the sensor and the temperature of the temperature sensor rapidly increases as shown in FIG. 19B, and when a low-temperature object contacts the sensor and the temperature of the temperature sensor rapidly decreases as shown in FIG. 19C, the output of the temperature sensor (a hardware) for detecting the environmental temperature is unstable, so that temperature compensation is difficult.

SUMMARY OF THE INVENTION

The present invention has been made in view of the foregoing circumstances, and it is an object of the present invention to provide a temperature compensation method for a force sensor which can perform temperature compensation in not only a steady range where the output of the force sensor is stable but also a transient range where the output thereof is unstable, and the force sensor.

In order to achieve the above object, a first aspect of the present invention provides a temperature compensation method for a force sensor, the method performing temperature compensation on the force sensor by eliminating an effect of an environmental temperature from a sensor output value that indicates an output value by the force sensor in a transient range where an output by the force sensor is unstable or in a steady range where the output is stable, and the method comprising: a preparation step of obtaining a varying pattern of the environmental temperature in the transient range before the force sensor measures an external force; and a correction step of estimating the varying pattern from the environmental temperature while the force sensor is measuring the external force, and of correcting the sensor output value using a correction value based on the estimated varying pattern.

The temperature compensation method for the force sensor with such a configuration can determine whether or not the output by the force sensor during measurement of the external force is in the transient range by obtaining beforehand the varying pattern of the sensor output based on a change in the environmental temperature in the transient range. When the output by the force sensor is in the transient range, it is possible to estimate the varying pattern from the environmental temperature of the force sensor, and to correct the sensor output value using a correction value obtained based on the estimated varying pattern.

In the aforementioned force sensor temperature compensation method, the preparation step includes: a first monitoring-output-value detecting step of causing a monitoring-output-value detecting unit to detect a monitoring output value indicating the environmental temperature at a predetermined sampling cycle; a threshold storing step of causing a monitoring resistance-change calculating unit to calculate a slope of the monitoring output value relative to a sampling time in a rising or falling of the transient range, and to store the slope as a threshold in a memory; and a function storing step of causing the monitoring resistance-change calculating unit to calculate a function representing a change in the monitoring output value in the transient range together with time, and to store the calculated function in the memory in association with the threshold, the correction step includes: a sensor-output-value detecting step of causing a sensor-output-value detecting unit to detect the sensor output value in the transient range or in the steady range at the predetermined sampling cycle; a second monitoring-output-value detecting step of causing the monitoring-output-value detecting unit to detect the monitoring output value in the transient range or in the steady range at the predetermined sampling cycle; a slope calculating step of causing the monitoring resistance-change calculating unit to calculate a slope of the monitoring output value relative to the sampling time; a slope comparing step of causing a transient change determining unit to compare the threshold stored in the threshold storing step with the slope calculated in the slope calculating step; and a sensor-output-value correcting step of causing a transient correcting unit to substitute the sampling time into the function associated with the threshold based on a comparison result by the slope comparing step, and to add or subtract an obtained correction value to or from the sensor output value, thereby correcting the sensor output value.

The temperature compensation method for the force sensor with such a configuration causes, in the preparation step, the temperature compensation unit to obtain the pattern of the monitoring output value in the transient range beforehand and store the obtained pattern in the memory as a threshold and a function. Next, in the correction step, the method compares the threshold obtained beforehand with a monitoring output value, and determines whether or not the output (the monitoring output value) by the force sensor is in the transient range. When it is determined that the output by the force sensor is in the transient range, a sampling time is substituted in the function associated with the threshold in order to obtain a correction value, and the correction value is added to or subtracted from the sensor output value, thereby correcting the sensor output value.

A second aspect of the present invention provides a force sensor that measures an external force, the force sensor comprising: a force sensor chip that detects the external force based on a change in a resistance value of a strain detecting resistive element in accordance with a magnitude of the external force; and a temperature compensation unit that eliminates an effect of an environmental temperature from a sensor output value which indicates an output value by the force sensor in a transient range where an output by the force sensor is unstable or in a steady range where the output is stable, in which the temperature compensation unit obtains a varying pattern of the environmental temperature in the transient range before the force sensor is measuring the external force, estimates the varying pattern from the environmental temperature while the force sensor is measuring the external force, and corrects the sensor output value using a correction value based on the estimated varying pattern.

The force sensor with such a configuration can determine whether or not the output by the force sensor during measurement of the external force is in the transient range by obtaining the varying pattern of the environmental temperature in the transient range beforehand. When the output by the force sensor is in the transient range, it is possible to estimate the varying pattern from the environmental temperature of the force sensor, and the sensor output value can be corrected using the correction value based on the estimated varying pattern.

In the aforementioned force sensor, the force sensor chip includes: a base member that includes: an action portion where the external force is applied; a support portion in a frame shape that supports the action portion therearound; and a connecting portion that connects the action portion and the support portion together, a plurality of strain detecting resistive elements that are formed at respective connected portions between the action portion and the connecting portion; and a monitoring resistive element which is arranged in the vicinity of the strain detecting resistive element and which detects a monitoring output value indicating the environmental temperature in the transient range or in the steady range at a predetermined sampling cycle, and the temperature compensation unit stores, as a threshold, a slope of the monitoring output value in a rising or falling of the transient range before the force sensor measures the external force in a memory, calculates a function representing a change in the monitoring output value in the transient range together with time, and stores the calculated function in the memory in association with the threshold, the temperature compensation unit including: a monitoring resistance-change calculating unit that calculates a slope of the monitoring output value relative to a sampling time in the transient range or in the steady range while the force sensor is measuring the external force; a transient change determining unit that compares the threshold stored in the memory before the force sensor measures the external force with the slope calculated while the force sensor is measuring the external force; and a transient correcting unit which substitutes the sampling time into the function associated with the threshold based on a comparison result by the transient change determining unit, and adds or subtracts an obtained correction value to or from the sensor output value, thereby correcting the sensor output value.

The force sensor with such a configuration causes, before measuring the external force by the force sensor, the temperature compensation unit to obtain the pattern of the monitoring output value in the transient range beforehand, and stores the obtained pattern as a threshold and a function in the memory. The force sensor compares the threshold obtained beforehand with the monitoring output value during measurement of the external force by the force sensor, and determines whether or not the output (the monitoring output value) by the force sensor is in the transient range. When determining that the output by the force sensor is in the transient range, the force sensor substitutes a sampling time in the function associated with the threshold in order to obtain a correction value, and adds or subtracts the correction value to or from the sensor output value, thereby correcting the sensor output value.

In the aforementioned force sensor, the connecting portion includes a T-shaped beam region with an elastic portion and a bridge portion, and the T-shaped beam region is formed so as to be symmetrical at four locations around a center of the action portion.

The force sensor with such a configuration has the T-shaped beam region formed so as to be symmetrical at four locations around the center of the action portion and including the elastic portion and the bridge portion, so that the support portion can support the action portion from the four directions in a well-balanced manner.

In the aforementioned force sensor, the action portion, the support portion, and the connecting portion are functionally separated from one another by a first through-hole.

The force sensor with such a configuration separates the action portion and the support portion by the through-hole, so that an external force applied to the action portion is not dispersed to the support portion, etc., but is concentrated on the strain detecting resistive element. Hence, it is possible to detect the external force applied to the action portion more precisely.

In the aforementioned force sensor, the elastic portion has a smaller rigidity than the bridge portion.

The force sensor chip with such a configuration allows the elastic portion with a smaller rigidity to absorb excessive strain applied to the bridge portion with a higher rigidity when an external force is applied to the action portion, thereby suppressing a strain of the whole force sensor chip originating from an application of a force or a moment only in one direction. Hence, the strain detecting resistive element corresponding to a force or a moment in a specific direction can selectively produce a strain, thereby remarkably suppressing interference in another axial direction.

In the aforementioned force sensor, the region with a high rigidity and the region with a small rigidity are functionally separated by a second through-hole.

The force sensor with such a configuration separates the region with a higher rigidity and the region with a smaller rigidity by the through-hole, so that an external force applied to the action portion is not dispersed to the support portion, etc., but is concentrated on the strain detecting resistive element. Hence, it is possible to detect the external force applied to the action portion more precisely.

BRIEF DESCRIPTION OF THE DRAWINGS

FIG. 1A is a perspective view for explaining a general configuration of a force sensor according to an embodiment, and is a perspective view showing an external appearance of the force sensor;

FIG. 1B is a perspective view for explaining a general configuration of a force sensor according to an embodiment, and is a perspective view showing an internal configuration of the force sensor with a cross section;

FIG. 9A is a perspective view showing how an attenuation device behaves when an external force is applied;

FIG. 9B is a perspective view showing how the attenuation device behaves when an external force is applied;

FIG. 9C is a perspective view showing how the attenuation device behaves when an external force is applied;

FIG. 9D is a perspective view showing how the attenuation device behaves when an external force is applied;

FIG. 19A is a diagram showing a graph which indicates an output characteristic of a force sensor provided with a strain detecting resistive element and which indicates an output characteristic of the force sensor right after the sensor is activated;

FIG. 19B is a diagram showing a graph which indicates an output characteristic of a force sensor provided with a strain detecting resistive element and which indicates an output characteristic of the force sensor when the sensor is rapidly heated; and FIG. 19C is a diagram showing a graph which indicates an output characteristic of a force sensor provided with a strain detecting resistive element and which indicates an output characteristic of the force sensor when the sensor is rapidly cooled.

DETAILED DESCRIPTION OF THE PREFERRED EMBODIMENTS

Figure 2:
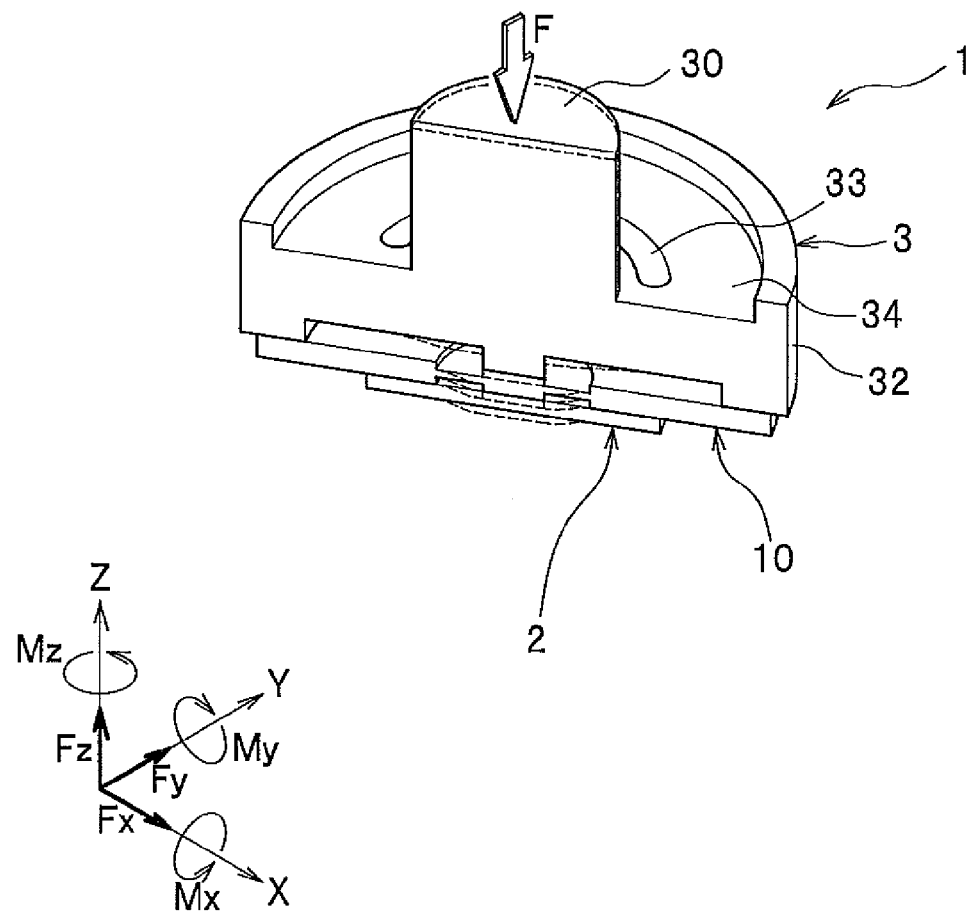
FIG. 2 is a perspective cross-sectional view exemplarily showing how external force is attenuated and is transferred to a force sensor chip.

An explanation will be given of a temperature compensation method for a force sensor and the force sensor according to an embodiment of the present invention with reference to the accompanying drawings. First, a whole configuration of the force sensor according to an embodiment will be explained in detail with reference to FIGS. 1A to 2. In the figures referred to below, in order to facilitate understanding, an attenuation device, a glass beam, etc., are shown in a simplified manner, so that respective shapes and positional relationships are exemplarily abstracted in some cases. Also, the level of strain, etc., is also shown exaggeratingly in some cases.

As shown in FIG. 1A, a force sensor 1 has an external appearance formed in a discoidal shape with a protruding input portion 30, and includes a force sensor chip 2 (see FIG. 1B) detecting hexaxial components of a transferred external force F, and an attenuation device 3 which causes the external force F to be attenuated and transfers the attenuated external force to the force sensor chip 2. As shown in FIG. 1B, the force sensor chip 2 of the force sensor 1 and the attenuation device 3 thereof are joined together via a glass member 10.

An explanation will be given of an example case in which the force sensor 1 is a hexaxial force sensor 1 that is capable of detecting hexaxial force and moment components of an external force F. More specifically, it is presumed that force components are Fx, Fy, and Fz in an X axis, a Y axis, and a Z axis orthogonal to one another. Also, moment components are Mx, My, and Mz around the X axis, the Y axis, and the Z axis. In this embodiment, the hexaxial force sensor 1 is explained as an example, however, the present invention is not limited to the number of detection axes of the force sensor 1 and the magnitude of the external force F.

The force sensor chip 2 plays a center role in the sensor function of the force sensor chip 1 that detects an external force F and a moment in individual three axes (X axis, Y axis and Z axis) orthogonal to one another. As shown in FIG. 1B, the force sensor chip 2 has a base member 20 (see FIG. 3) including an action portion 21 where an attenuated external force F is transferred from a transfer portion 31 of the attenuation device 3, a support portion 22 that supports the action portion 21, and a connecting portion 23 that connects the action portion 21 and the support portion 22 together. The force sensor chip 2 will be explained in more detail later.

The attenuation device 3 is for attenuating the external force F to be an appropriate magnitude, and for transferring the attenuated force to the force sensor chip 2. As shown in FIG. 1A, the attenuation device 3 functions as an exterior package of the force sensor 1. Also, the attenuation device 3 includes an input portion 30 where the external force F is input, the transfer portion 31 which attenuates the external force F applied to the input portion 30 and which transfers the attenuated force to the action portion 21 of the force sensor chip 2, a fixing portion 32 which is provided around the input portion 30 and the transfer portion 31 and which is fixed to an automatic operating machine, such as a machine tool or a robot, and a disk portion 34 that connects the fixing portion 32 and the input portion 30 together.

The disk portion 34 around the input portion 30 of the attenuation device 3 is provided with buffer holes 33 each formed in an arcuate slotted shape in a planar view as shown in FIG. 1A. As shown in FIG. 1A, the buffer holes 33 are for letting out components of the external force F applied to the input portion 30 other than a perpendicular component in order to attenuate the external force F.

Because the attenuation device 3 is provided with the disk portion 34 that connects the connecting portion 23 and the input portion 30 together, the external force F applied to the input portion 30 is mainly received by the fixing portion 32 and is transferred to the exterior as shown in FIG. 2. Also, because the disk portion 34 is provided with buffer holes 33, the input portion 30 is capable of deforming in a direction in which the external force F acts, the external force F is attenuated, some of which is transferred from the input portion 30 to the action portion 21 of the force sensor chip 2 through the transfer portion 31. This suppresses a breakage of the force sensor chip 2 due to repeated application of the external force F. Note that the attenuation device 3 can be formed of a metal material, such as stainless steel, aluminum (an alloy), or carbon steel.

The glass member 10 is for insulating the force sensor chip 2 and the attenuation device 3 from each other. As shown in FIGS. 1A to 2, the glass member 10 is in a disk shape as a whole, and is joined to the lower surface of the connecting portion 23 of the attenuation device 3 and the lower surface of the transfer portion 31 thereof. The force sensor chip 2 is fixed to the lower surface of the attenuation device 3 via the glass member 10. Because the force sensor 1 has the glass member 10 provided between the force sensor chip 2 and the attenuation device 3, it is possible to suppress electrical failure like power-source leakage, peeling of the joined portion originating from the difference in respective thermal expansion coefficients of the force sensor chip 2 and the attenuation device 3, thermal strain, etc.

Figure 3:
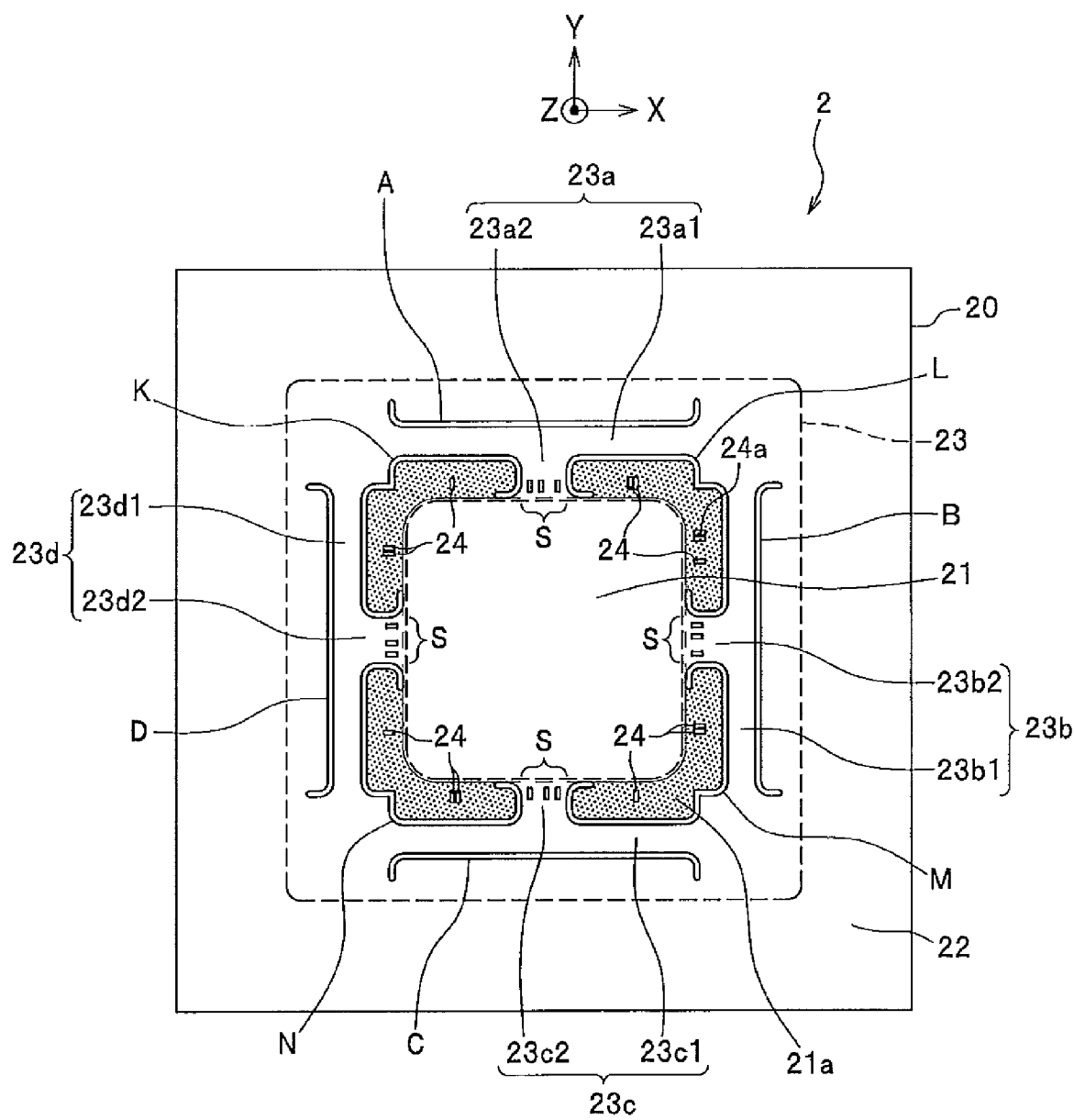
FIG. 3 is a plan view for explaining a general configuration of the force sensor chip according to the embodiment.

Next, a detailed explanation will be given of a configuration of the force sensor chip 2 with reference to FIGS. 3 and 4. As shown in FIG. 3, the force sensor chip 2 is formed on the base member 20 that is formed in a substantially square shape in a planar view. As shown in FIG. 3, the base member 20 includes the action portion 21 where the external force F (see FIGS. 1A and 1B) is transferred, the support portion 22 that supports the action portion 21 through the connecting portion 23, and the connecting portion 23 that connects the action portion 21 and the support portion 22 together.

Also, as shown in FIG. 3, arranged at respective positions on the base member 20 are strain detecting resistive elements S that detect the magnitude of the external force F and the direction thereof, temperature-compensation resistive elements 24 that perform temperature compensation on respective strain detecting resistive elements S, and monitoring resistive elements 24a that obtain a chip temperature. As shown in FIG. 4, the strain detecting resistive elements S, the temperature-compensation resistive elements 24 and the monitoring resistive elements 24a are connected to signal electrode pads 25 and GND electrode pads 26, so that predetermined voltage is applied thereto.

The base member 20 is a basal part of the force sensor chip 2. As shown in FIG. 3, the base member 20 includes the action portion 21, extending portions 21a extending from the action portion 21, the support portion 22, and the connecting portion 23. Also, as shown in FIG. 3, through-holes A, B, C, D, K, L, M, and N are formed in the base member 20. The base member 20 can be comprised of, for example, a semiconductor substrate like silicon.

The action portion 21 is a region where the external force F is applied. As shown in FIG. 3, the action portion 21 is formed in a square shape at the center of the force sensor chip 2. As explained above, the action portion 21 is joined to the transfer portion 31 of the attenuation device 3 via the glass member 10 in a cross-sectional view (see FIG. 1B).

As shown in FIG. 3, the extending portions 21a are regions extending in respective through-holes K, L, M, and N from respective ends of the action portion 21 and each formed in a hook-like shape. As shown in FIG. 3, the extending portions 21a have respective one ends continuous from the action portion 21 but have respective another ends facing respective through-holes K, L, M, and N and non-continuous from the support portion 22 and the connecting portion 23. Hence, the extending portions 21a are free ends which displace together with the continuous action portion 21 when the external force F is applied and the action portion 21 displaces, but which do not produce a strain because the extending portions 21a are non-continuous from the support portion 23 and the connecting portion 23.

The support portion 22 is a region that supports the action portion 21 through the connecting portion 23. As shown in FIG. 3, the support portion 22 is formed around the periphery of the force sensor chip 2, and is formed in a rectangular frame shape. Also, as explained above, the support portion 22 is wholly or partially joined to the connecting portion 23 of the attenuation device 3 via the glass member 10 (see FIG. 1B). The shape of the support portion 22 is not limited to the rectangular frame shape as long as it can support the action portion 21, and can be, for example, a circular frame shape.

The connecting portion 23 is a region for connecting the action portion 21 and the support portion 22. As shown in FIG. 3, the connecting portion 23 is formed between the action portion 21 and the support portion 22. Also, as explained above, the connecting portion 23 is joined to the connecting portion 23 of the attenuation device 3 via the glass member 10 (see FIG. 1B). Furthermore, as will be discussed later, the connecting portion 23 has the through-holes A, B, C, D, K, L, M, and N formed in a thin slit shape at respective predetermined locations.

As shown in FIG. 3, the connecting portion 23 includes T-shaped beam-like regions 23a, 23b, 23c, 23d, including elastic portions 23a1, 23b1, 23c1, 23d1, respectively, and bridge portions 23a2, 23b2, 23c2, and 23d2, respectively. As shown in FIG. 3, the elastic portions 23a1, 23b1, 23c1, and 23d1 have respective both ends in the lengthwise direction connected to the inner periphery of the support portion 22, and have respective centers connected to respective one ends of the corresponding bridge portions 23a2, 23b2, 23c2, and 23d2. Also, as shown in FIG. 3, the bridge portions 23a2, 23b2, 23c2, and 23d2 have respective one ends in the lengthwise direction connected to respective corresponding elastic portions 23a1, 23b1, 23c1, and 23d1, and have respective another ends connected to the action portion 21.

As shown in FIG. 3, it is preferable that the T-shaped beam-like regions 23a, 23b, 23c, and 23d should be formed correspondingly to the four sides of the force sensor chip 2 so as to be symmetrical at four positions to the center of the action portion 21. By forming the T-shaped beam-like regions 23a, 23b, 23c, and 23d so as to be symmetrical at four positions around the action portion 21, the support portion 22 can support the action portion 21 from four directions in a well-balanced manner.

Also, it is preferable that the elastic portions 23a1, 23b1, 23c1, and 23d1 should be formed so as to have a higher rigidity than respective bridge portions 23a2, 23b2, 23c2, and 23d2.

In this fashion, by forming each of T-shaped beam-like regions 23a, 23b, 23c, and 23d separated into a region with a low rigidity and a region with a high rigidity, when the external force F is applied to the action portion 21, the elastic portions 23a1, 23b1, 23c1, and 23d1 absorb excessive strain applied to respective bridge portions 23a2, 23b2, 23c2, and 23d2, thereby suppressing a strain of the whole force sensor chip 2 originating from an application of a force or a moment only in a direction. Hence, it is possible to cause the strain detecting resistive elements S to selectively produce a strain corresponding to a force or a moment in a certain direction, thereby remarkably suppressing interference in another axial direction.

The term "interference in another axial direction" is a phenomenon such that when a single force component is input, even though the input of other force components is "0", a measurement result does not become "0" originating from disturbance like noises, i.e., a phenomenon that causes a measurement value of a force or a moment to be varied by a force or a moment in another axis.

As shown in FIG. 3, the through-holes (first through-holes) A, B, C, and D are each a substantially straight slit-like hole formed in the base member 20 so as to pass all the way therethrough in the thickness direction. The through-holes A, B, C, and D have a role of functionally separating the action portion 21, the support portion 22, and the connecting portion 23 from one another. By having such through-holes A, B, C, and D, the force sensor chip 2 does not cause the external force F applied to the action portion 21 to be dispersed to the support portion 22, etc., but can cause the external force F to be concentrated on the strain detecting resistive elements S to be discussed later, thereby detecting the external force F applied to the action portion 21 more precisely.

As shown in FIG. 3, the through-holes (second through-holes) K, L, M, and N are each formed from the end of the action portion 21, and is formed in an ancyroid slit in the base member 20 so as to pass all the way therethrough in the thickness direction. The through-holes K, L, M, and N have a role of functionally separating the elastic portions 23a1, 23b1, 23c1, and 23d1 that are regions with a low rigidity and the bridge portions 23a2, 23b2, 23c2, and 23d2 that are regions with a high rigidity. By having such through-holes K, L, M, and N, the force sensor chip 2 does not cause the external force F applied to the action portion 21 to be dispersed to the support portion 22, etc., but can cause the external force F to be concentrated on the strain detecting resistive elements S to be discussed later, thereby detecting the external force F applied to the action portion 21 more precisely.

The strain detecting resistive elements S are for detecting the magnitude of the external force F and the direction thereof in the force sensor chip 2. The strain detecting resistive elements S are each comprised of a piezo resistive element that changes a resistance value proportional to a deformation, and detect a strain originating from an application of the external force F as a change in the resistance value. The strain detecting resistive elements S can be formed by, for example, ion implantation of a dopant like boron into the base member 20 through a semiconductor manufacturing process.

As shown in FIG. 3, the strain detecting resistive elements S are formed on the base member 20, and a plurality of strain detecting resistive elements S are formed at deformation producing portions that are connected portions between the action portion 21 and the connecting portion 23. As shown in FIG. 3, the deformation producing portions indicate the proximate connection portions between the action portion 21 and each of the bridge portions 23a2, 23b2, 23c2, and 23d2 where a strain originating from the external force F applied to the action portion 21 most often happens. As shown in FIG. 3, the strain detecting resistive elements S are each formed so as to be parallel to the lengthwise axis direction of each of the bridge portions 23a2, 23b2, 23c2, and 23d2.

Figure 4:
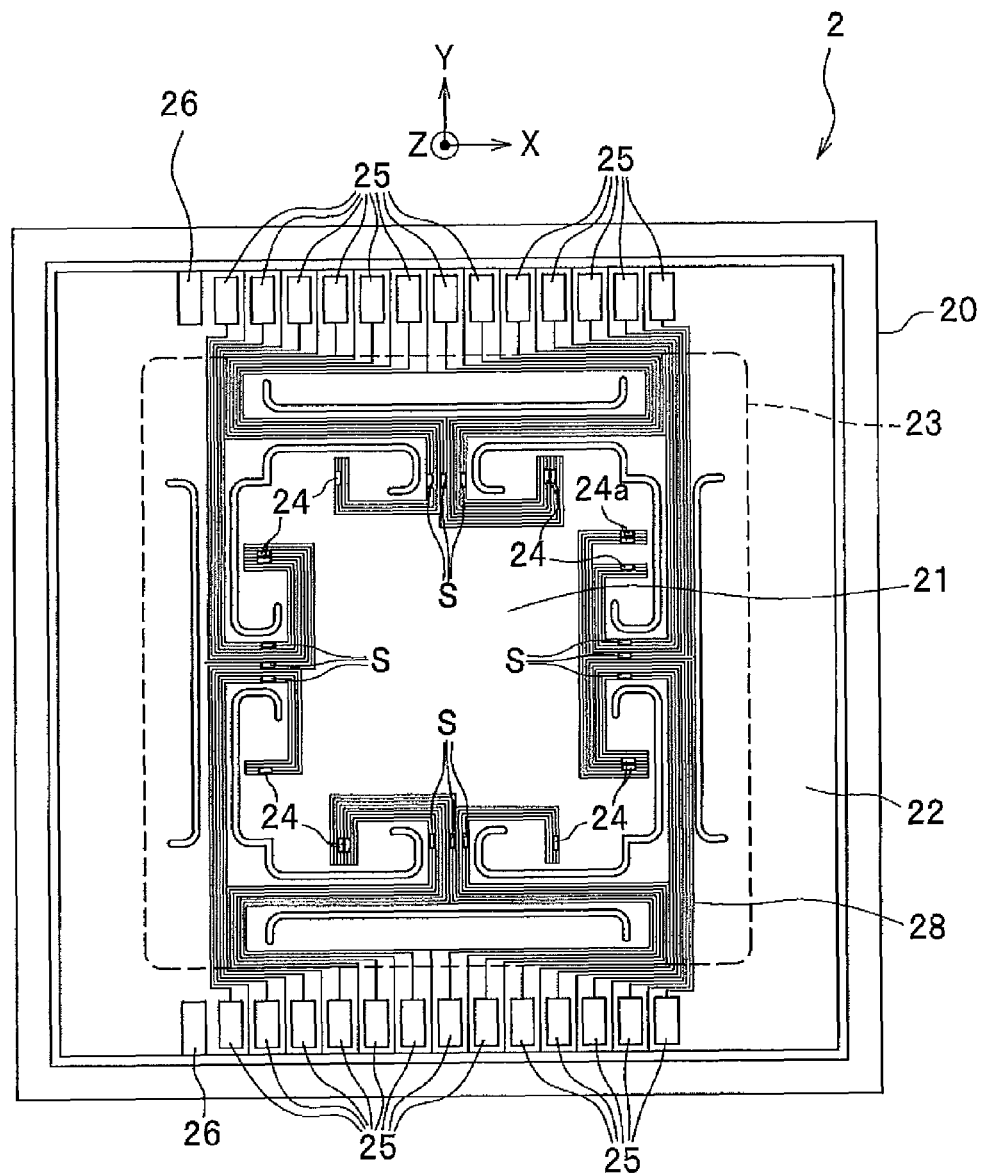
FIG. 4 is a plan view for explaining the detail of a configuration of the force sensor chip according to the embodiment.

As shown in FIG. 4, the strain detecting resistive elements S are connected to the signal electrode pads 25 and the GND electrode pads 26 through wirings 28. Also, as will be discussed later, each of the strain detecting resistive elements S configures a bridge circuit together with a temperature-compensation resistive element 24, and external resistors R1, and R2. Accordingly, changes in respective resistance values of the strain detecting resistive element S and the temperature-compensation resistive element 24 are input into an AD converter 40 which outputs a sensor output value Vs. The bridge circuit configured by the strain detecting resistive element S functions as a sensor-output-value detecting unit 11 (see FIG. 5) for detecting the sensor output value Vs at a predetermined sampling interval in a transient range where the output by the force sensor 1 is unstable or in a steady range where the output by the force sensor 1 is stable.

In this embodiment, the sensor output value Vs is a change in the resistance value which corresponds to a strain detected by the strain detecting resistive element S and which is calculated as a voltage value by the AD converter 40. More specifically, the sensor output value Vs is a differential output value by the above-explained bridge circuit (see FIG. 6) configured by the strain detecting resistive element S. Because the strain detecting resistive element S has a temperature dependency which changes the resistance value depending on an environmental temperature as explained above, a strain is produced originating from two factors: an application of the external force F; and a change in the environmental temperature. The force sensor 1 of this embodiment eliminates a change in the environmental temperature from the two factors using the temperature compensation unit 4, and performs temperature compensation, thereby measuring true force and moment.

The temperature-compensation resistive elements 24 are for performing temperature compensation on respective strain detecting resistive elements S. The temperature-compensation resistive elements 24 are each comprised of a piezo resistive element, and each detects a change in the environmental temperature as a change in the resistance value. The temperature-compensation resistive elements 24 can be formed by, for example, ion implantation of a dopant like boron into the base member 20 through a semiconductor manufacturing process.

The temperature-compensation resistive elements 24 are each comprised of an element having the same characteristic as that of the strain detecting resistive element S. Also, as shown in FIG. 3, the temperature-compensation resistive elements 24 are formed on the base member 20, and twelve temperature-compensation resistive elements 24 are arranged at the extending portions 21a in the vicinity of respective strain detecting resistive elements S so as to correspond to the twelve strain detecting resistive elements S on the base member 20.

As shown in FIG. 3, the temperature-compensation resistive elements 24 are arranged at respective locations which are not affected by a strain originating from an application of the external force F. That is, as shown in FIG. 3, each of the temperature-compensation resistive elements 24 is arranged at the extending portion 21a near each of the through-holes K, L, M, and N that are free ends in the vicinity of corresponding strain detecting resistive elements S. By having the temperature-compensation resistive elements 24 arranged at locations which are not affected by the external force F, the force sensor chip 2 can obtain an output with the temperature characteristic inherent as the physicality of an element being canceled.

The monitoring resistive elements 24a are for obtaining a chip temperature (also a temperature after a sensor is assembled). The monitoring resistive elements 24a are each comprised of a piezo resistive element, and each detects a change in the chip temperature, i.e., the environmental temperature as a change in the resistance value. The monitoring resistive elements 24a can be formed by, for example, ion implantation of a dopant like boron into the base member 20 through a semiconductor manufacturing process.

The monitoring resistive elements 24a are each comprised of an element having the same characteristic as that of the strain detecting resistive element S. Also, as shown in FIG. 3, the monitoring resistive elements 24a are formed on the base member 20, and are arranged at the extending portion 21a in the vicinity of the strain detecting resistive elements S. As explained above, the temperature-compensation resistive element 24 is provided on the base member 20 for each strain detecting resistive element S, and configures the bridge circuit together with the strain detecting resistive element S, but the monitoring resistive elements 24a are provided chip by chip. Other resistors R3, R4, and R5 (see FIGS. 6 and 7) configuring the bridge circuit together with the monitoring resistive element 24a are formed on an analog substrate (not illustrated) outside the chip.

As shown in FIG. 3, the monitoring resistive elements 24a are arranged at locations which are not affected by the applied external force F. That is, each of the monitoring resistive elements 24a is arranged at the extending portion 21a that is a free end in the vicinity of the inner periphery of the through-hole L and in the vicinity of the corresponding temperature-compensation resistive element 24. By having the monitoring resistive elements 24a arranged at a location which is not affected by the external force F, the force sensor chip 2 can obtain the chip temperature of the force sensor chip 2 itself.

As shown in FIG. 4, the monitoring resistive element 24a is connected to the signal electrode pads 25 and the GND electrode pads 26 through the wirings 28. As explained above, each of the monitoring resistive elements 24a configures the bridge circuit together with the external resistors R3, R4, and R5, so that the change in the resistance value of the monitoring resistive element 24a is input into the AD converter 40 which outputs a monitoring output value Vm. The bridge circuit configured by the monitoring resistive element 24a functions as a monitoring-output-value detecting unit 12 (see FIG. 5) for detecting a monitoring output value Vm at a predetermined sampling cycle in a transient range where the output by the force sensor 1 is unstable and in a steady range where the output by the force sensor 1 is stable.

In this embodiment, the monitoring output value Vm is a change in the resistance value which corresponds to a strain detected by the monitoring resistive element 24a and which is calculated by the AD converter 40 as a voltage value. More specifically, the monitoring output value Vm is a differential output value by the bridge circuit (see FIG. 6) configured by the above-explained monitoring resistive element 24a. Like the strain detecting resistive elements S, the monitoring resistive elements 24a have a temperature dependency which changes the resistance value depending on an environmental temperature, but because the monitoring resistive elements 24a are arranged at a location which is not affected by the strain originating from the applied external force F, so that a strain is produced only by a change in the environmental temperature.

The bridge circuit configured by the monitoring resistive element 24a detects the monitoring output values Vm at two time points: before the force sensor 1 measures the external force F; and while the force sensor 1 is measuring the external force F. When the monitoring output value Vm is detected before the external force F is measured, a transient range where the output is unstable is artificially replicated by, for example, activating, rapidly heating, or rapidly cooling the force sensor 1.

The signal electrode pads 25 and the GND electrode pads 26 are for applying a voltage to the strain detecting resistive elements S, the temperature-compensation resistive elements 24 and the monitoring resistive elements 24a. As shown in FIG. 4, the signal electrode pads 25 and the GND electrode pads 26 are connected to respective strain detecting resistive elements S, temperature-compensation resistive elements 24, and monitoring resistive elements 24a through the wirings 28.

As shown in FIG. 4, the wirings 28 are for connecting the strain detecting resistive elements S, the temperature-compensation resistive elements 24 and the monitoring resistive elements 24a to the signal electrode pads 25 and the GND electrode pads 26. The wirings 28 connect the strain detecting resistive element S and the temperature-compensation resistive element 24 together on the base member 20 so that both can configure the bridge circuit.

Next, an explanation will be given of the temperature compensation unit 4 of the force sensor 1 according to this embodiment with reference to FIG. 5. By having the temperature compensation unit 4, the force sensor 1 can eliminate the effect of the environmental temperature and can perform temperature compensation in not only a steady range where the output by the force sensor 1 is stable but also a transient range where the output by the force sensor 1 is unstable.

The steady range (a steady condition, a steady time) is, as is indicated by the right of the hatched regions in FIGS. 19A, 19B, and 19C, a range (a condition) where the output by the force sensor 1 is constant relative to a sampling time t and is stable. Also, the transient range (a transient condition, a transient time) of the force sensor 1 is, as is indicated by the left of the hatched regions in FIGS. 19A, 19B, and 19C, a range (a condition) where the output by the force sensor 1 is not constant relative to the sampling time t and is unstable.

The temperature compensation unit 4 eliminates the effect of the environmental temperature from the sensor output value Vs input from the bridge circuit configured by the above-explained strain detecting resistive element S, i.e., the sensor-output-value detecting unit 11, and performs temperature compensation on the sensor output value Vs. More specifically, the temperature compensation unit 4 is an external micro-computer, etc., of the force sensor chip 2. The temperature compensation unit 4 may be built in the force sensor chip 2 as long as it can perform temperature compensation on the sensor output value Vs appropriately.

Figure 5:
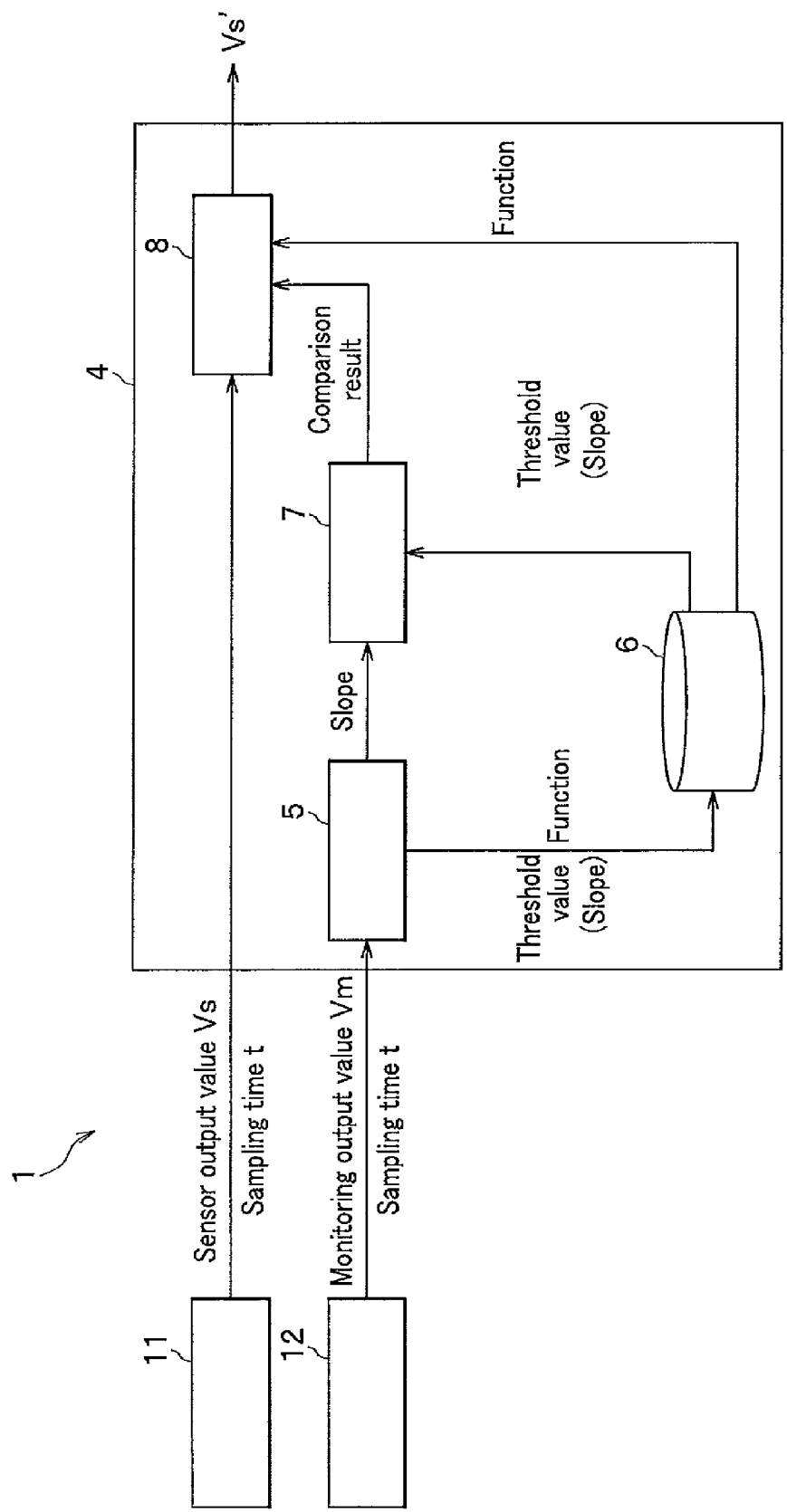
FIG. 5 is a block diagram showing the detail of a configuration of a temperature-compensation unit of the force sensor according to the embodiment.

As shown in FIG. 5, inputs into the temperature compensation unit 4 are the sensor output value Vs detected by the sensor-output-value detecting unit 11 and the sampling time t of the sensor output value Vs. As explained above, the sensor output value Vs is a value expected as being including not only the effect of the external force F but also the effect of the environmental temperature.

Also, as shown in FIG. 5, inputs into the temperature compensation unit 4 are the monitoring output value Vm detected by the bridge circuit configured by the monitoring resistive element 24a, i.e., the monitoring-output-value detecting unit 12 and the sampling time t of the monitoring output value Vm. The sensor-output-value detecting unit 11 and the monitoring-output-value detecting unit 12 detect respective output values at the same timing, so that the sampling time t input into the temperature compensation unit 4 from respective units is same.

Also, as shown in FIG. 5, the temperature compensation unit 4 corrects the sensor output value Vs using the sensor output value Vs input from the sensor-output-value detecting unit 11 and the monitoring output value Vm and the sampling time t input from the monitoring-output-value detecting unit 12, and outputs a sensor output value Vs'. The sensor output value Vs' is input into an external force analyzing apparatus (not illustrated), and the external force analyzing apparatus calculates the magnitude of the external force F and that of the moment.

As shown in FIG. 5, the temperature compensation unit 4 mainly comprises a monitoring resistance-change calculating unit 5, a memory 6, a transient change determining unit 7, and a transient correcting unit 8. The sensor output value Vs, the monitoring output value Vm and the sampling time t are subjected to software processing by individual units. Individual units are explained in more detail with reference to FIG. 5.

The monitoring resistance-change calculating unit 5 calculates a slope $\Delta Vm/\Delta t$ of the monitoring output value Vm relative to the sampling time t in the transient range or the steady range. As shown in FIG. 5, inputs into the monitoring resistance-change calculating unit 5 are the monitoring output value Vm detected by the monitoring-output-value detecting unit 12 and the sampling time t of the monitoring output value Vm. Note that the monitoring output values Vm and the sampling times t thereof before the force sensor 1 measures the external force F and while the force sensor 1 is measuring the external force F are input into the monitoring resistance-change calculating unit 5.

That is, before the force sensor 1 measures the external force F, the monitoring resistance-change calculating unit 5 calculates the slope $\Delta Vm/\Delta t$ of the monitoring output value Vm relative to the sampling time t at the time of rising or falling of the transient range among the input monitoring output values Vm and sampling times t. The monitoring resistance-change calculating unit 5 sets the slope $\Delta Vm/\Delta t$ as a threshold, and stores, as is indicated by an arrow extending downwardly in FIG. 5, the threshold in the memory 6. When the slope $\Delta Vm/\Delta t$ of the monitoring output value Vm is obtained before the force sensor 1 measures the external force F, as explained above, the transient range where the output is unstable is artificially replicated by, for example, activating, rapidly heating, or rapidly cooling the force sensor 1.

The rising or falling of the transient range is, for example, a region circularly surrounded by a dashed line in FIGS. 19A, 19B, and 19C. The rising or falling of the transient range each has the slope $\Delta Vm/\Delta t$ unique to the transient range. Accordingly, by calculating the slope $\Delta Vm/\Delta t$ beforehand and storing such a slope in the memory unit 6, as will be discussed later, it becomes easily possible to determine whether or not the monitoring output value Vm detected by the monitoring-output-value detecting unit 12 while the force sensor 1 is measuring the external force F is in the transient range. The detail of the determination for the transient range will be discussed later.

Before the force sensor 1 measures the external force F, the monitoring resistance-change calculating unit 5 calculates a function indicating a change in the monitoring output value along with a time in the transient range from the input monitoring output value Vm and sampling time t thereof. The function is stored in the memory 6 beforehand as is indicated by an arrow extending downwardly in FIG. 5.

The above-explained function means a function that represents a change in the monitoring output value Vm relative to the sampling time t in the transient range, and is, for example, a curve of the output value V in the transient range shown in the left of the hatched region in each of FIGS. 19A, 19B, and 19C which is taken as a function. A specific example of such a function is a polynomial function like $f(x)=ax^5+bx^4+cx^3+dx^2+ex+f$. The item x in the function is a variable of the sampling time t, and by substituting the sampling time t in each x, it is possible to obtain a specific value of the function. As will be discussed later, the specific value obtained by substituting the sampling time t into the variable x of the function is used as a correction value for correcting the monitoring output value Vm at this sampling time t. The function of the monitoring output value Vm in the transient range indicates the varying pattern of the environmental temperature of the force sensor 1 in the transient range.

The monitoring resistance-change calculating unit 5 calculates the slope $\Delta Vm/\Delta t$ of the monitoring output value Vm relative to the sampling time t regardless of the transient range or the steady range while the force sensor 1 is measuring the external force F. The slope $\Delta Vm/\Delta t$ is output to the transient change determining unit 7 as is indicated by an arrow extending to the right of FIG. 5.

The memory 6 stores, as explained above, the threshold and the function calculated by the monitoring resistance-change calculating unit 5. As shown in FIG. 5, the memory 6 stores the input threshold and function in association with each other, outputs the threshold to the transient change determining unit 7 which will be discussed later, and outputs the function associated with the threshold to the transient correcting unit 8. When storing the threshold and the function in association with each other, the memory 6 can store those in the form of, for example, a table.

The transient change determining unit 7 compares the threshold stored in the memory 6 before the force sensor 1 measures the external force F with the slope $\Delta Vm/\Delta t$ of the monitoring output value Vm calculated during the measurement of the external force F, and determines whether or not the output by the force sensor 1 is in the transient range. As shown in FIG. 5, inputs into the transient change determining unit 7 are the threshold from the memory 6 and the slope $\Delta Vm/\Delta t$ of the monitoring output value Vm relative to the sampling time t from the monitor resistance-change calculating unit 5. The transient change determining unit 7 compares whether or not the slope $\Delta Vm/\Delta t$ is larger than, smaller than, or same as the threshold, and as shown in FIG. 5, inputs the comparison result to the transient correcting unit 8.

The threshold stored in the memory 6 beforehand is, as explained above, the slope $\Delta Vm/\Delta t$ of the monitoring output value Vm relative to the sampling time t of the rising or the falling in the transient range. Hence, by causing the transient change determining unit 7 to compare the threshold with the slope $\Delta Vm/\Delta t$ of the monitoring output value Vm in the measurement of the external force F, it is possible to easily determine whether or not the output by the force sensor 1 is in the transient range.

For example, when the slope $\Delta Vm/\Delta t$ in the rising of the transient range shown in FIGS. 19A and 19B is compared with the threshold, if the slope $\Delta Vm/\Delta t$ of the monitoring output value Vm during the measurement of the external force F is larger than the threshold, the transient change determining unit 7 can determine that the output by the force sensor 1 is in a condition right after the force sensor 1 is activated as shown in FIG. 19A or in a rapid heating condition shown in FIG. 19B.

On the other hand, when the slope $\Delta Vm/\Delta t$ in the falling of the transient range as shown in FIG. 19C is compared with the threshold, if the slope $\Delta Vm/\Delta t$ of the monitoring output value Vm during the measurement of the external force F is smaller than the threshold, the transient change determining unit 7 can determine that the output by the force sensor 1 is in a rapid cooling condition shown in FIG. 19C.

The transient correcting unit 8 corrects the sensor output value Vs through the above-explained function based on the comparison result by the transient change determining unit 7. As shown in FIG. 5, input into the transient correcting unit 8 are the monitoring output value Vm detected by the monitoring-output-value detecting unit 12 of the force sensor chip 2 and the sampling time t of that monitoring output value. Also, as shown in FIG. 5, input into the transient correcting unit 8 are the comparison result of the threshold with the slope $\Delta Vm/\Delta t$ from the transient change determining unit 7 and the function from the memory 6.

When the comparison result to the effect that the monitoring output value Vm is in the transient range is input from the transient change determining unit 7, the transient correcting unit 8 substitutes the sampling time t into the function associated with the threshold used for the determination, and generates a correction value. The sampling time t of this stage is a sampling time t of the sensor output value Vs subjected to correction. By substituting the sampling time t into the variable (the above-explained x) of the function obtained beforehand, it is possible to calculate a correction value at the time of the sampling time t. Next, the transient correcting unit 8 calculates a correction value for each sampling time t, and performs correction of adding or subtracting the correction value to or from the sensor output value Vs until the transient range ends.

More specifically, when, for example, the slope $\Delta Vm/\Delta t$ in the rising of the transient range is compared with the threshold, if the transient change determining unit 7 determines that the monitoring output value Vm of the force sensor 1 is in a condition right after the activation shown in FIG. 19A or in the rapid heating condition shown in FIG. 19B, the sampling time t is substituted in the variable of the function, and the obtained correction value is subtracted from the sensor output value Vs in order to perform correction.

On the other hand, when the slope $\Delta Vm/\Delta t$ in the falling of the transient range is compared with the threshold, if the transient change determining unit 7 determines that the output by the force sensor 1 is in the rapid cooling condition shown in FIG. 19C, the sampling time t is substituted in the variable of the function, and the obtained correction value is added to the sensor output value Vs in order to perform correction.

Next, a brief explanation will be given of the flow of a temperature compensation by the temperature compensation unit 4 with reference to FIG. 5. First, before the force sensor 1 measures the external force F, the transient range is artificially replicated by, activating, rapidly heating, or rapidly cooling the force sensor 1. Next, the monitoring-output-value detecting unit 12 detects the monitoring output value Vm indicating the environmental temperature in the transient range at the predetermined sampling cycle, and inputs the monitoring output value Vm into the monitoring resistance-change calculating unit 5 together with the sampling time t of that monitoring output value.

Next, the monitoring resistance-change calculating unit 5 calculates the slope $\Delta Vm/\Delta t$ of the monitoring output value Vm relative to the sampling time t in the rising or falling of the transient range, and stores the calculated slope in the memory 6 as the threshold. Also, the monitoring resistance-change calculating unit 5 calculates the function representing a change in the monitoring output value Vm together with a time in the transient range, and stores the calculated function in the memory 6 in association with the threshold.

Thereafter, the force sensor 1 starts measuring the external force F. Next, the monitoring-output-value detecting unit 12 detects the monitoring output value Vm in the transient or steady range at the predetermined sampling cycle, and inputs the monitoring output value Vm into the monitoring resistance-change calculating unit 5 together with the sampling time t of that monitoring output value.

Next, the monitoring resistance-change calculating unit 5 calculates the slope $\Delta Vm/\Delta t$ of the monitoring output value Vm relative to the sampling time t. Thereafter, the transient change determining unit 7 compares the threshold stored in the memory 6 before the measurement of the external force F with the slope $\Delta Vm/\Delta t$ calculated during the measurement of the external force F, and inputs the comparison result into the transient correcting unit 8.

Next, the transient correcting unit 8 obtains the function associated with the threshold used for the determination from the memory 6 based on the comparison result by the transient change determining unit 7. The transient correcting unit 8 substitutes the sampling time t into the function, thereby obtaining the correction value. The transient correcting unit 8 adds or subtracts the correction value to or from the sensor output value Vs in order to perform correction, and inputs the correction value as the sensor output value Vs' to the external force analysis device (not illustrated).

As explained above, the force sensor 1 of this embodiment causes the temperature compensation unit 4 to obtain the pattern of the monitoring output value Vm in the transient range before the force sensor 1 measures the external force F as the threshold and the function, and stores the obtained threshold and function in the memory 6. Next, while the force sensor 1 is measuring the external force F, the threshold obtained beforehand is compared with the monitoring output value Vm, and it is determined whether or not the output (the monitoring output value Vm) by the force sensor 1 is in the transient range. When the output by the force sensor 1 is in the transient range, the sampling time t is substituted in the function associated with the threshold in order to obtain the correction value, and the sensor output value Vs is corrected by adding or subtracting the correction value to or from the sensor output value Vs.

That is, the force sensor 1 of this embodiment determines, during the measurement of the external force F, whether or not the output is in the transient range from the slope $\Delta Vm/\Delta t$ of the monitoring output value Vm based on the threshold stored beforehand, and estimates the specific pattern of the transient range and correction value based on the function associated with the threshold beforehand, and thus is capable of correcting the sensor output value Vs. Accordingly, the force sensor 1 of this embodiment can eliminate the effect of the environmental temperature from the sensor output value Vs through the software processing in not only the steady range but also the transient range, and can measure the true external force F.

Next, a brief explanation will be given of the electrical connection between individual element and the temperature compensation unit 4 in the force sensor chip 2 according to this embodiment with reference to FIG. 6. The region surrounded by a dashed line in FIG. 6 indicates the interior of the force sensor chip 2 and the other regions indicate the exterior of the force sensor chip 2.

Figure 6:
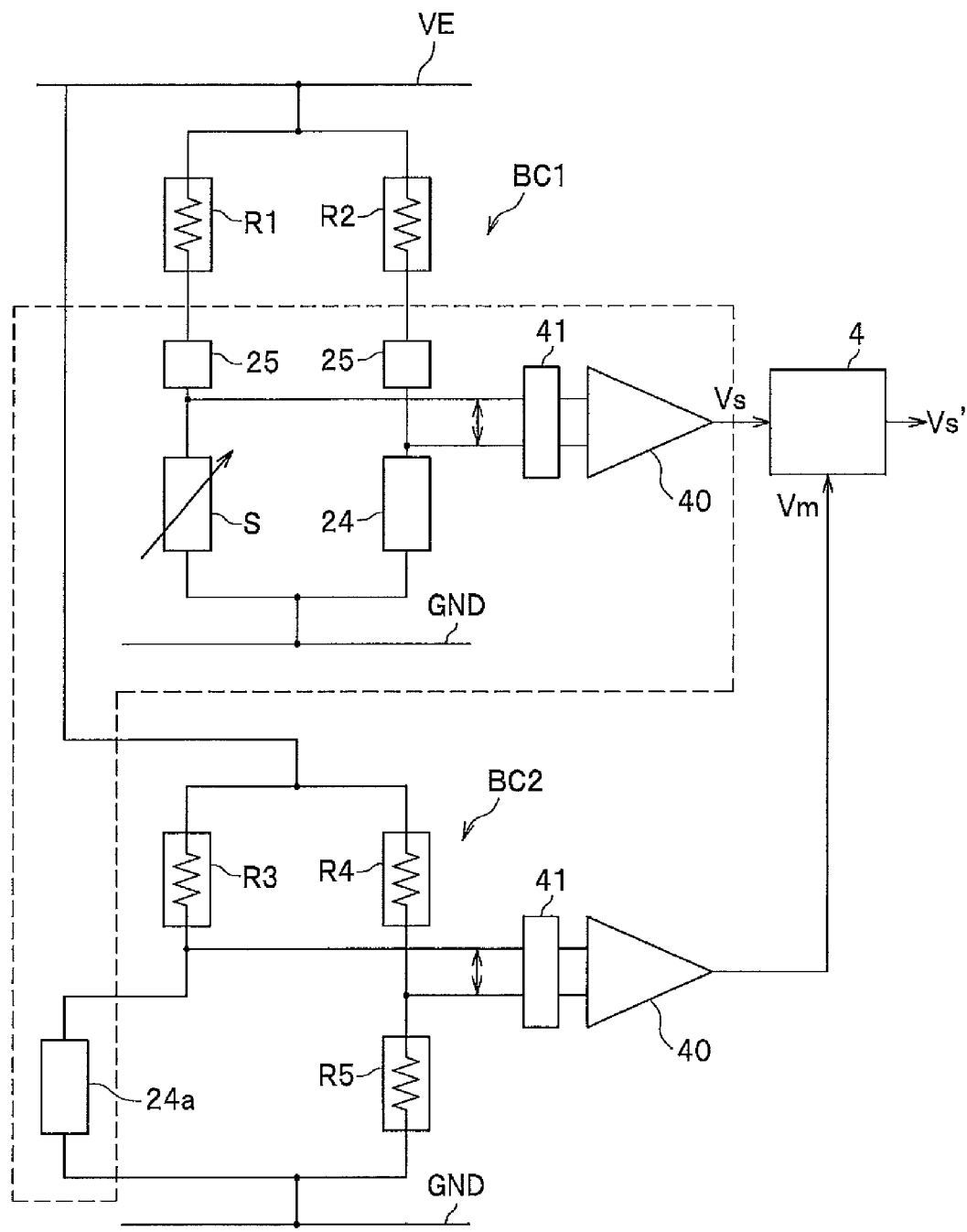
FIG. 6 is a circuit diagram showing an electrical connection when an LPF and an AD converter are built in the chip of the force sensor chip according to the embodiment.

In the force sensor chip 2, as shown in FIG. 6, the strain detecting resistive element S and the temperature-compensation resistive element 24 both built in the chip configure a bridge circuit BC1 together with the external resistors R1 and R2 provided outside the chip. The bridge circuit BC1 corresponds to the above-explained sensor-output-value detecting unit 11. The bridge circuit BC1 of this embodiment is a half-bridge circuit having the external resistors R1 and R2 provided outside the chip.

Also, in the force sensor chip 2, as shown in FIG. 6, the monitoring resistive element 24a built in the chip configures a bridge circuit BC2 together with the external resistors R3, R4, and R5 provided outside the chip. The bridge circuit BC2 corresponds to the above-explained sensor-output-value detecting unit 11.

In the bridge circuit BC1 configured by the strain detecting resistive element S, as shown in FIG. 6, respective one ends (the lower side of FIG. 6) of the strain detecting resistive element S and the temperature-compensation resistive element 24 are mutually connected, and are connected to the ground potential GND. Also, respective another ends (the upper side of FIG. 6) of the strain detecting resistive element S and the temperature-compensation resistive element 24 are connected to respective signal electrode pads 25. The signal electrode pads 25 are connected to the external resistors R1 and R2, respectively, outside the force sensor chip 2.

Figure 7:
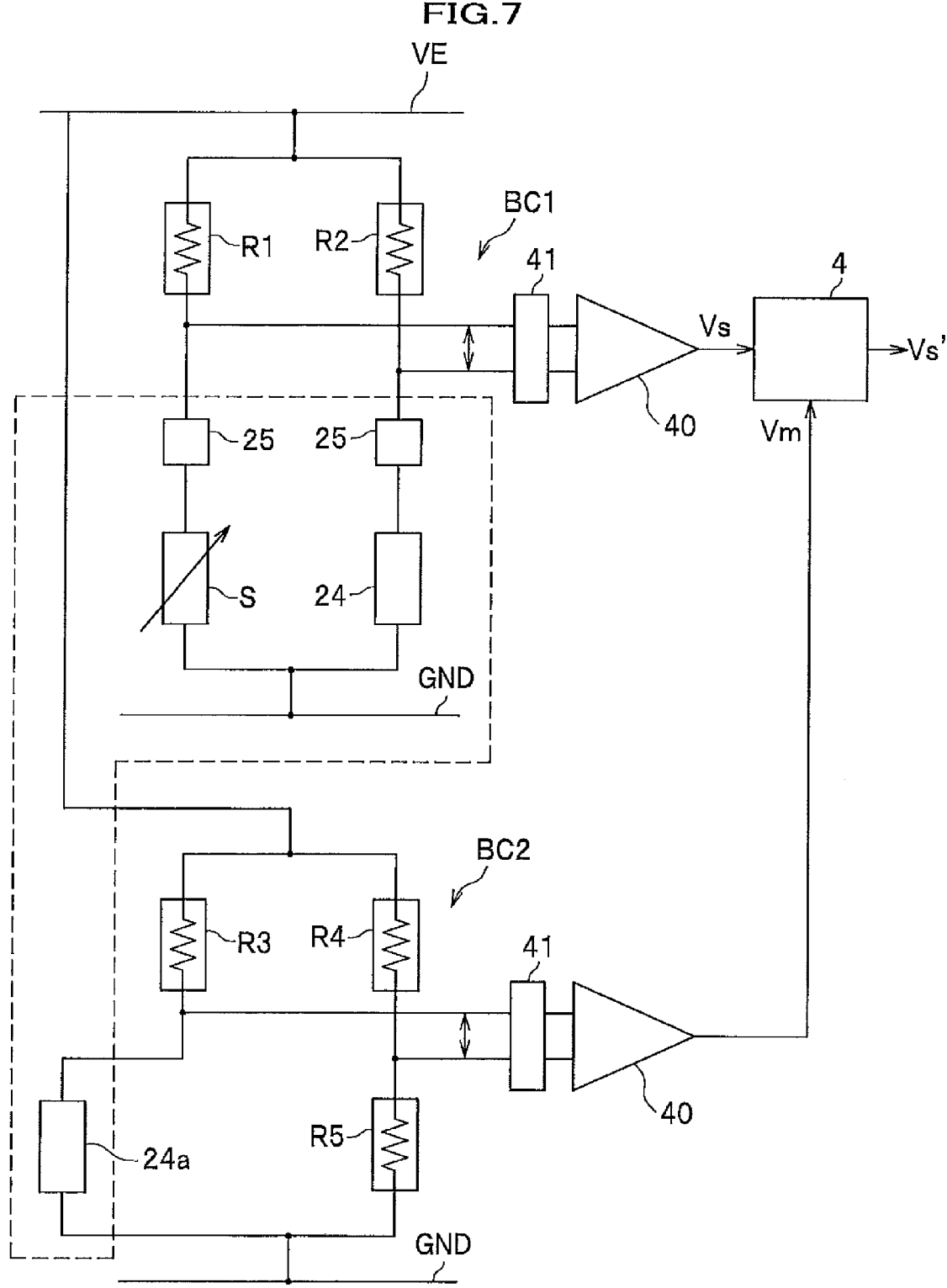
FIG. 7 is a circuit diagram showing an electrical connection when an LPF and an AD converter are provided outside the chip of the force sensor chip according to the embodiment.

In the bridge circuit BC1, as shown in FIG. 6, the strain detecting resistive element S and the temperature-compensation resistive element 24 are connected to the LPF (Low Pass Filter) 41 and the AD converter 40 both built in the sensor, and the strain detecting signals generated by the strain detecting resistive element S and the temperature-compensation resistive element 24, respectively, are input into the AD converter 40. Also, as shown in FIG. 7, the strain detecting resistive element S and the temperature-compensation resistive element 24 may be connected to the LPF (Low Pass Filter) 41 and the AD converter 40 arranged on an analog substrate (not illustrated) outside the chip, and the strain detecting signals generated by the strain detecting resistive element S and the temperature-compensation resistive element 24, respectively, may be input into the AD converter 40.

Figure 8:
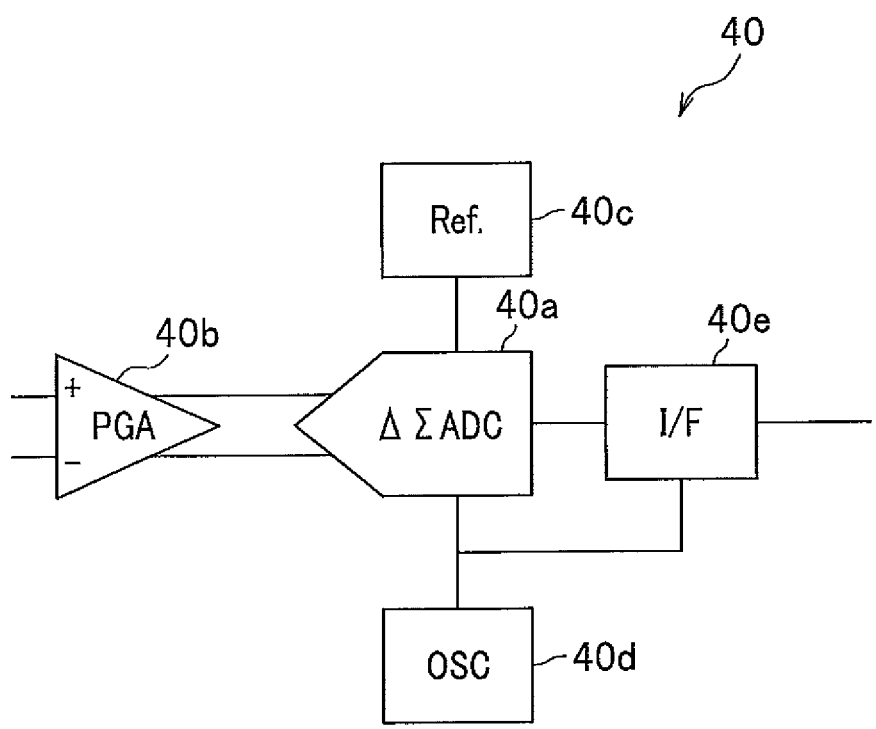
FIG. 8 is a schematic diagram showing a specific configuration of an AD converter.

More specifically, as shown in FIG. 8, the AD converter 40 includes a $\Delta\Sigma AD$ converter (delta sibma AD converter) 40a that performs AD conversion on the strain detecting signal, a PGA (Programmable Gain Amplifier) 40b that takes a difference between the two strain detecting signals, an Ref. (Reference) 40c that applies a reference voltage, an OSC (Oscillator) 40d that oscillates a timing pulse for an AD conversion, and an I/F (Interface) 40e.

The $\Delta\Sigma AD$ converter 40a converts an analog signal into a digital signal and realizes low power consumption, high-speed clock operation, and a high SNR (Signal-to-Noise Ratio: a ratio of a signal relative to noise) in comparison with general AD converters. Respective configurations of the AD converter 40 including the $\Delta\Sigma AD$ converter 40a are conventionally well-known, so that the detailed explanation for the function, operation, etc., of such converters is omitted.

In such a bridge circuit BC1, the AD converter 40 calculates a differential output value between the strain detecting resistive element S and the temperature-compensation resistive element 24, i.e., the sensor output value Vs having the physicality of the strain detecting resistive element S and the temperature characteristic of the temperature-compensation resistive element 24 canceled, and inputs the calculated sensor output value Vs to the temperature compensation unit 4 outside the chip.

On the other hand, in the bridge circuit BC2 configured by the monitoring resistive element 24a, as shown in FIG. 6, the monitoring resistive element 24a is connected to an LPF (Low Pass Filter) 41 and an AD converter 40 both provided outside the chip, and the strain detecting signal generated by the monitoring resistive element 24a is input into the AD converter 40.

In the bridge circuit BC2, the AD converter 40 calculates the monitoring output value Vm indicating the environmental temperature of the force sensor 1, and inputs the calculated monitoring output value Vm into the temperature compensation unit 4 outside the chip.

The temperature compensation unit 4 performs software processing on the sensor output value Vs and the monitoring output value Vm input as explained above, and calculates a value having the sensor output value Vs with the effect of the environmental temperature being eliminated therefrom.

The force sensor chip 2 may have the external resistors R1, R2 shown in FIG. 6 and built in the force sensor chip 2 in order to configure a full-bridge circuit. By having the full-bridge circuit in this fashion, the force sensor chip 2 can cancel a change in the resistance value originating from a temperature change from a change in the resistance value of the strain detecting resistive element S, and can appropriately take out only a change in the resistance value of the strain detecting resistive element S originating from the external force. Hence, it becomes possible to detect the external force applied to the action portion 21 more precisely.

Next, an explanation will be given of an operation of the force sensor 1 in more detail with reference to FIGS. 9A to 13B. First, a behavior of the attenuation device 3 when the external forces F with various axial components are input will be explained with reference to FIGS. 12A and 12B.

For example, as shown in FIG. 9A, when the external force Fx in the X axis direction is input into the input unit 30, the input unit 30 extremely slightly moves in the X axis direction. Likewise, when the external force Fz in the Z axis direction is input, as shown in FIG. 9B, the input unit 30 moves in the Z axis direction. Also, when the moment My around the Y axis is input, as shown in FIG. 9C, the input unit 30 rotates around the Y axis, and when the moment Mz around the Z axis is input, as shown in FIG. 9D, the input unit 30 rotates around the Z axis. The same is true of cases when other axial components are input, so that the explanation thereof will be omitted.

An explanation will be given of how the force sensor chip 2 produces a strain when the external force Fx, Fz, and the moment My, Mz are input with reference to FIGS. 10A to 13B.

Figure 10A:
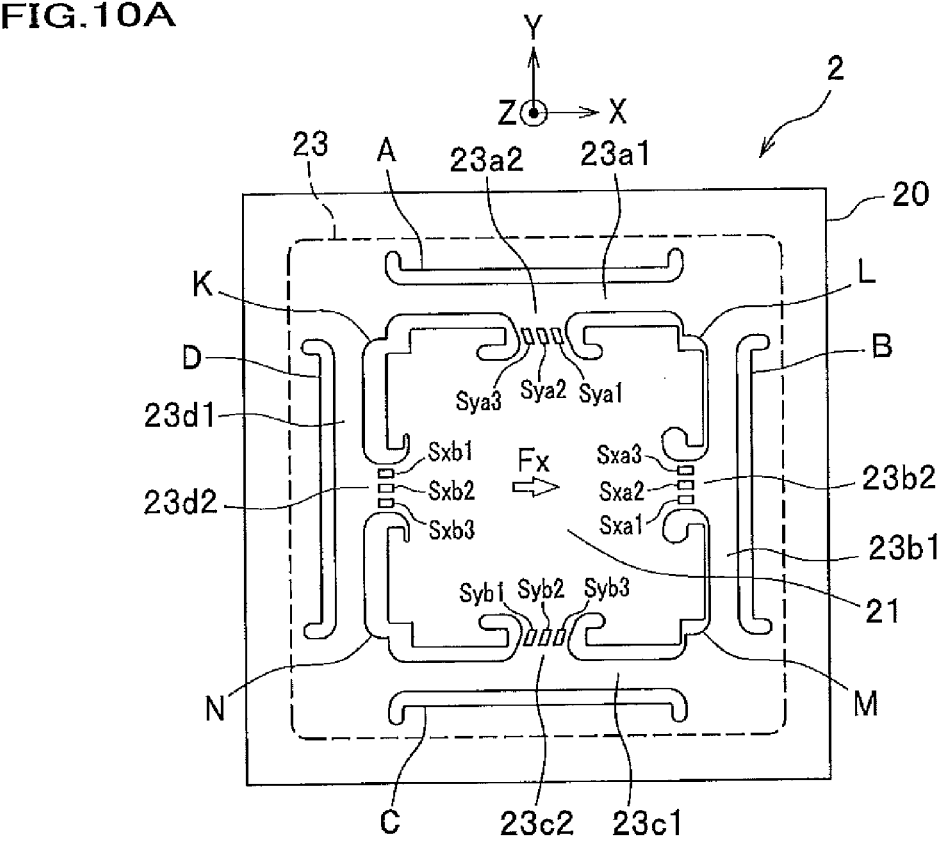
FIG. 10A is an exemplary diagram and is a plan view for explaining how a strain resistive element deforms when an external force Fx in an X axis direction is applied to an action portion.
Figure 10B:
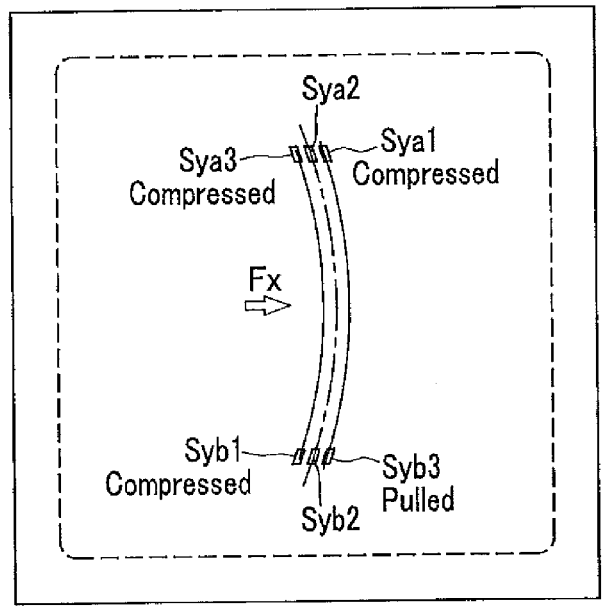
FIG. 10B is an exemplary diagram and is a plan view for explaining how a strain detecting resistive element deforms.

As shown in FIG. 10A, when the action portion 21 moves in the X direction due to an application of the external force Fx, bridge portions 23a2, and 23c2 remarkably produce a strain upon movement of the action portion 21. At this time, as shown in FIG. 10B, pull forces act on the strain detecting resistive elements Sya1 and Syb3 outwardly of the strain, and respective resistance values increase. On the other hand, compression forces act on the strain detecting resistive elements Sya3 and Syb1 inwardly of the strain, and respective resistance values decrease. No external force Fx affects the strain detecting resistive elements Sxa1 to Sxa3 and Sxb1 to Sxb3.

Figure 11A:
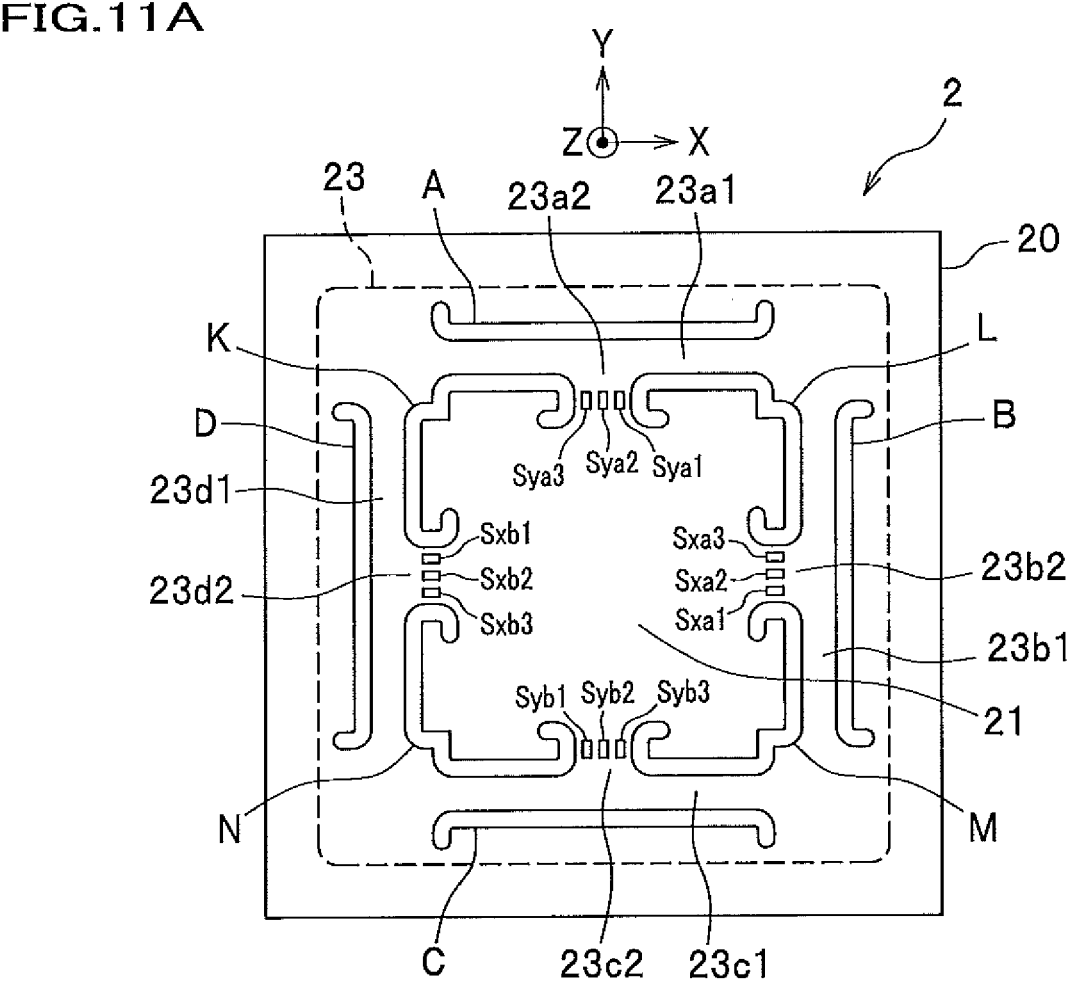
FIG. 11A is an exemplary diagram and is a plan view showing how a strain detecting resistive element deforms when an external force Fz in a Z axis direction is applied to the action portion.
Figure 11B:
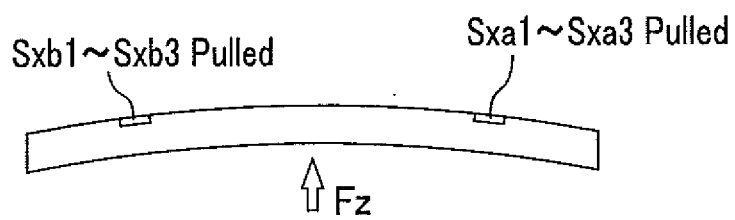
FIG. 11B is an exemplary diagram and is a cross-sectional view showing how a strain resistive element deforms.

As shown in FIG. 11B, when the action portion 21 moves in the Z direction due to an application of the external force Fz, the bridge portions 23a2, 23b2, 23c2, and 23d2 remarkably produce a strain upon movement of the action portion 21. At this time, because each of the strain detecting resistive elements Sxa1 to Sxa3, Sxb1 to Sxb3, Sya1 to Sya3, and Syb1 to Syb3 is formed on the surface (the upper layer part) of the base member 20, pull forces act on all of the strain detecting resistive elements Sxa1 to Sxa3, Sxb1 to Sxb3, Sya1 to Sya3, and Syb1 to Syb3, and respective resistance values increase.

Figure 12A:
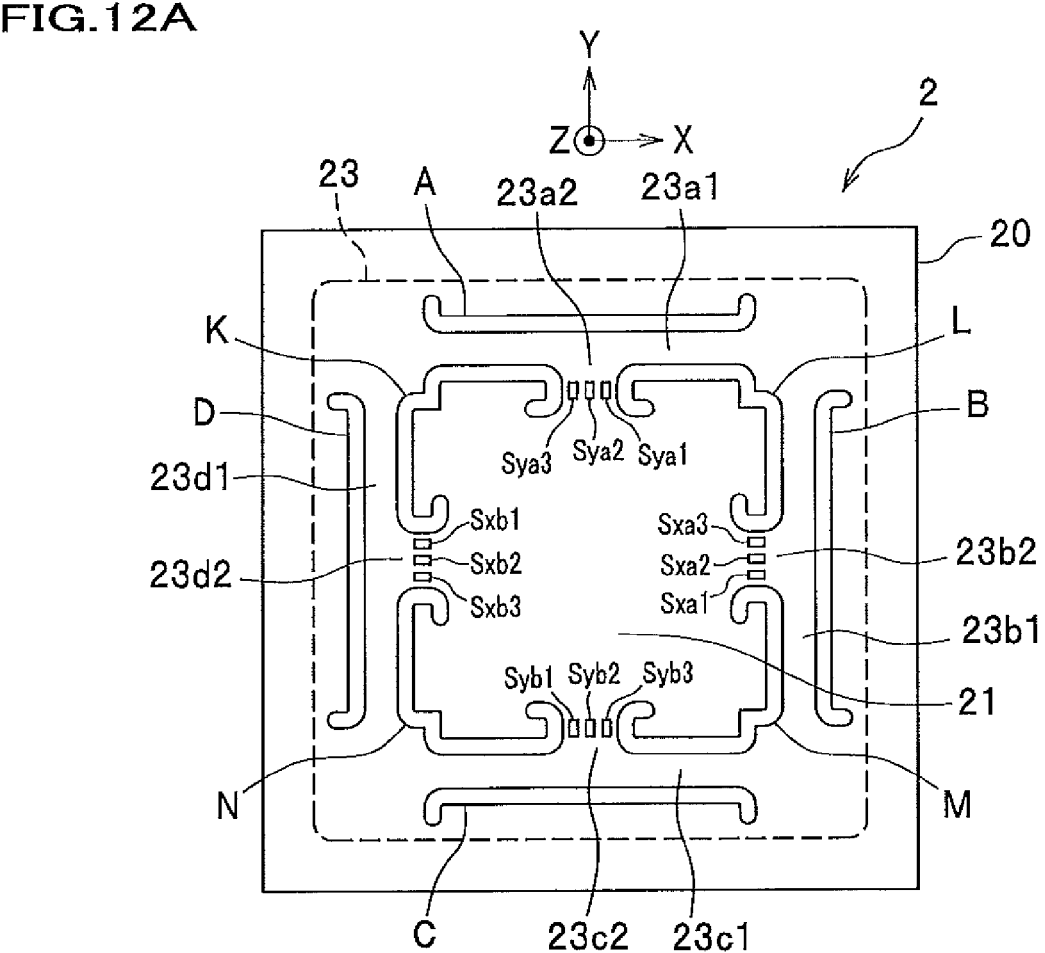
FIG. 12A is an exemplary diagram and is a plan view showing how a strain resistive element deforms when a moment My around a Y axis is applied.
Figure 12B:
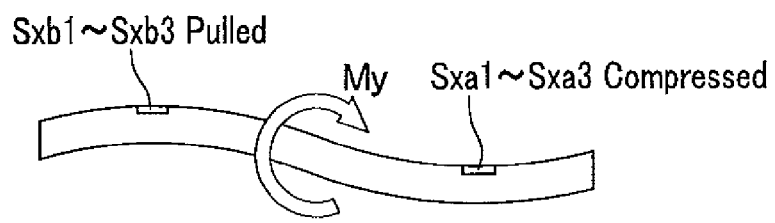
FIG. 12B is an exemplary diagram and is a cross-sectional view showing how a strain resistive element deforms.

As shown in FIG. 12B, when the moment My is applied, each of the bridge portions 23b2 and 23d2 in the X axis direction produces strain due to the moment My, compression forces act on the strain detecting resistive elements Sxa1 to Sxa3, and respective resistance values decrease. On the other hand, pull forces act on the strain detecting resistive elements Sxb1 to Sxb3, and respective resistance values increase. However, substantially no pull force and compression force act on the bridge portions 23a2 and 23c2 in the Y axis direction, and respective resistance values remain same.

Figure 13A:
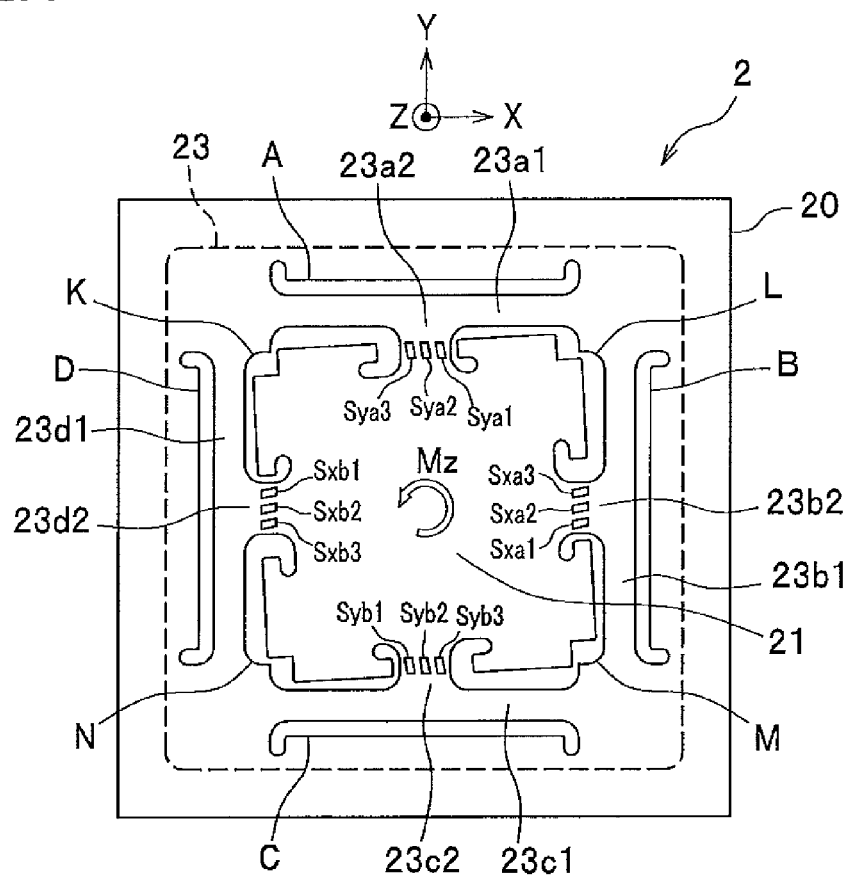
FIG. 13A is an exemplary diagram and is a plan view showing how a strain resistive element deforms when a moment Mz around a Z axis is applied.
Figure 13B:
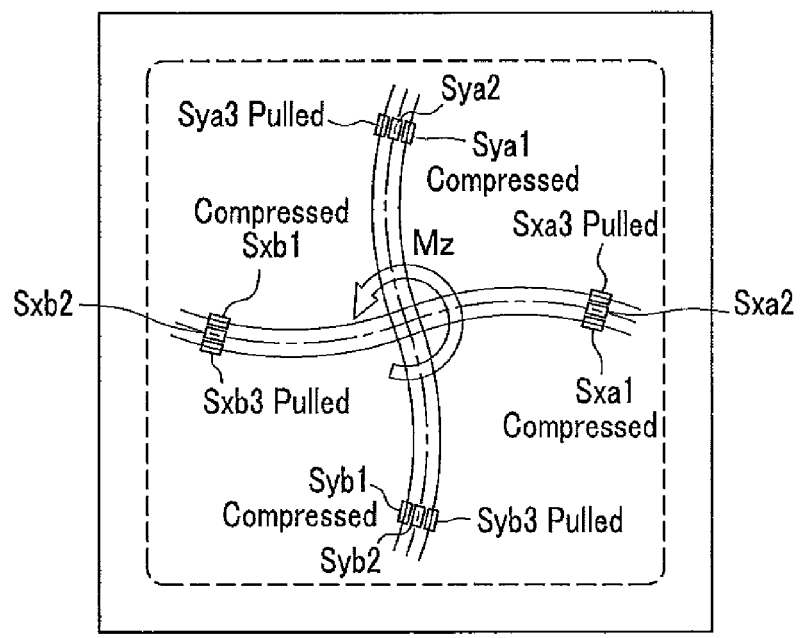
FIG. 13B is an exemplary diagram and is a plan view showing how a strain resistive element deforms.

As shown in FIG. 13B, when the moment Mz is applied, each of the bridge portions 23a2, 23b2, 23c2, and 23d2 produces strain due to the application of the moment Mz, pull forces act on the strain detecting resistive elements Sya3, Sxa3, Syb3, and Sxb3 arranged outwardly of the strain, and respective resistance values increase. On the other hand, compression forces act on the strain detecting resistive elements Sya1, Sxa1, Sby1, and Sxb1 arranged inwardly of the strain, and respective resistance values decrease. However, substantially no pull force and compression force act on the strain detecting resistive elements Sxa2, Sxb2, Sya2, and Syb2 located at the center of the strain, so that respective resistance values remain same.

The conceptual brief explanation was given of a relationship between each component (force or moment) contained in the external force F and force acting on the strain detecting resistive element S with components of representative four axial directions being as examples. When a compression force or a pull force acts on the strain detecting resistive element S, the resistance value thereof decreases or increases, and the bridge circuit BC1 (see FIG. 6) detects a change rate (a resistance change rate) of the resistance value.

Based on the resistance change rate, a signal output eventually by the hexaxial force sensor 1 is each of calculated resistance change rates Sig1 to Sig6 corresponding to each of the single components (Fx, Fy, Fz, Mx, My, and Mz). That is, the calculated resistance change rates Sig1 to Sig6 are set as follows from respective resistance change rates corresponding to respective components (Fx, Fy, Fz, Mx, My, and Mz) contained in the external force F with the effect of the interference in another axial direction being eliminated as much as possible. The resistance change rate is referred to as, for example, Sya1, but this indicates the resistance change rate of Sya1.

$$Sig1 = ((Sya1 - Sya3) + (Syb3 - Syb1))/4$$

$$Sig2 = ((Sxa3 - Sxa1) + (Sxb1 - Sxb3))/4$$

$$Sig3 = (Sxa2 + Sya2 + Sxb2 + Sy2)/4$$

$$Sig4 = (Sya2 - Syb2)/2$$

$$Sig5 = (Sba2 - Sxa2)/2$$

$$Sig6 = ((Sxa3 - Sxa1) + (Sya3 - Sya1) + (Sxb3 - Sxb1) + (Syb3 - Syb1))/8$$

An explanation will now be given of a relationship between the hexaxial components (Fx, Fy, Fz, Mx, My, and Mz) and the calculated resistance change rates Sig1 to Sig6. In order to calculate each component of the applied force F based on each of the calculated resistance change rates Sig1 to Sig6 that are output signals by the force sensor 1, an external force with a single component is applied to the force sensor chip 2 beforehand, and each of the output signals Sig1 to Sig6 at this time is obtained beforehand. This enables confirmation of the relationship between the hexaxial components (Fx, Fy, Fz, Mx, My, and Mz) and the calculated resistance change rates Sig1 to Sig6.

More specifically, when, for example, the external force Fx is applied to the force sensor chip 2, the moment My is also applied in practice, but the shape of the force sensor chip 2 and the arrangement of the strain detecting resistive elements S are designed so as to be symmetrical at four locations, the effect of interference in another axial direction is suppressed as much as possible, so that Sig1 can be expressed as a primary expression of Fx and My. Likewise, when Fy is applied to the force sensor chip 2, Sig2 can be expressed as a primary expression of Fy and Mx. Sig3 can be mainly expressed as a primary expression of Fz (it is possible to suppress another axial component as much as possible so that such another axial component can be ignorable).

The same is true of the moment, and when Mx is applied to the force sensor chip 2, Sig4 can be expressed as a primary expression of Mx and Fy. Also, when My is applied to the force sensor chip 2, Sig5 can be expressed as a primary expression of My and Fx. Sig6 can be expressed as a primary expression of Mz (it is possible to suppress another axial component as much as possible so that such another axial component can be ignorable).

Through the above-explained test, the calculated resistance change rates Sig1 to Sig6 can be expressed as respective primary expressions of hexaxial components (Fx, Fy, Fz, Mx, My, and Mz) with the effect of interference in another axial direction being eliminated as much as possible. By obtaining an inverse matrix from such primary expression, the hexaxial components (Fx, Fy, Fz, Mx, My, and Mz) can be expressed as respective primary expressions of the calculated resistance change rates Sig1 to Sig6. Thus way, the hexaxial components (Fx, Fy, Fz, Mx, My, and Mz) can be obtained from the calculated resistance change rates Sig1 to Sig6.

While the force sensor 1 explained above is measuring the external force F, the strain detecting resistive element S has a temperature dependency that changes the resistance value thereof due to an environmental temperature, so that when the environmental temperature changes during the measurement of the external force F, the external force F may be incorrectly detected even though the external force F is not applied in practice. However, the force sensor 1 of this embodiment determines, while measuring the external force F, whether or not the output is in the transient range based on the slope $\Delta Vm/\Delta t$ of the monitoring output value Vm using the threshold stored beforehand, and estimates the specific pattern of the transient range and the correction value based on the function stored in association with the threshold beforehand, thereby correcting the sensor output value Vs. Accordingly, the force sensor 1 of this embodiment can eliminate the effect of the environmental temperature from the sensor output value Vs through the software processing in not only the steady range but also the transient range, thereby measuring the true external force F.

Next, a detailed explanation will be given of a temperature-compensation method by the force sensor 1 according to this embodiment with reference to FIG. 5 as needed. The temperature compensation method by the force sensor 1 can eliminate the effect of the environmental temperature and can perform temperature compensation in not only the steady range where the output by the force sensor 1 is stable but also the transient range where the output by the force sensor 1 is unstable using the temperature compensation unit 4.

The temperature compensation method by the force sensor 1 includes a preparation step of obtaining the varying pattern of the environmental temperature of the force sensor 1 in the transient range before the force sensor 1 measures the external force F, and a correction step of correcting the sensor output value Vs by a correction value based on the varying pattern while the force sensor 1 is measuring the external force F.

Also, the preparation step includes a first monitoring-output-value detecting step, a threshold storing step, and a function storing step. The correction step includes a sensor-output-value detecting step, a second monitoring-output-value detecting step, a slope calculating step, a slope comparing step, and a sensor-output-value correcting step. An explanation will now be given of each of the steps in more detail.

The first monitoring-output-value detecting step is for causing the monitoring-output-value detecting unit 12 to detect the monitoring output value Vm indicating the environmental temperature in the transient range at the predetermined sampling cycle. That is, in this step, before the force sensor 1 measures the external force F, the monitoring output value Vm in the transient range is detected beforehand. In this preparation step, the transient range is artificially reproduced by, activating, rapidly heating, or rapidly cooling the force sensor 1.

The threshold storing step is for causing the monitoring resistance-change calculating unit 5 to calculate the slope $\Delta Vm/\Delta t$ of the monitoring output value Vm relative to the sampling time t in the rising or falling of the transient range, and to store such a slope as the threshold in the memory 6. As explained above, the rising or falling of the transient range has a unique slope $\Delta Vm/\Delta t$ to each other. Hence, by calculating such a slope $\Delta Vm/\Delta t$ beforehand and storing the data thereof in the memory 6, as will be discussed later, it is possible to easily determine whether or not the monitoring output value Vm detected by the monitoring-output-value detecting unit 12 is in the transient range while the force sensor 1 is measuring the external force F.

The function storing step is for causing the monitoring resistance-change calculating unit 5 to calculate the function representing the change in the monitoring output value Vm together with time in the transient range, and to store such a function in the memory 6 in association with the threshold. This function represents the change in the monitoring output value Vm relative to the sampling time t in the transient range as explained above, and by substituting the sampling time t in the variable x, the correction value for correcting the sensor output value Vs at the sampling time t can be calculated. Such a function of the monitoring output value Vm in the transient range represents the varying pattern of the environmental temperature of the force sensor 1 in the transient range.

The sensor-output-value detecting step is for causing the sensor-output-value detecting unit 11 to detect the sensor output value Vs in the transient range or in the steady range at the predetermined sampling cycle. As explained above, the sensor-output-value detecting unit 11 has a temperature dependency that changes the resistance value thereof depending on the environmental temperature, so that the sensor output value Vs detected by the sensor-output-value detecting unit 11 may include not only the effect by an application of the external force F but also the effect of the environmental temperature. Accordingly, through respective steps to be discussed later, the effect of the environmental temperature is eliminated from the sensor output value Vs detected in this step.

The second monitoring-output-value detecting step is for causing the monitoring-output-value detecting unit 12 to detect the monitoring output value Vm in the transient range or in the steady range at the predetermined sampling cycle. That is, in this step, while the force sensor 1 is measuring the external force F, the monitoring output value Vm in the transient range or in the steady range is detected, and the effect of the environmental temperature during the measurement of the external force F is monitored. This step is simultaneously executed as the above-explained sensor-output-value detecting step, the same sampling cycle as that of the sensor-output-value detecting step is applied.

The slope calculating step is for causing the monitor resistance-change calculating unit 5 to calculate the slope $\Delta Vm/\Delta t$ of the monitoring output value Vm relative to the sampling time t. The slope ΔVm/Δt calculated in this step is compared with the threshold in the slope comparing step to be discussed later, and it is determined whether or not the monitoring output value Vm of the force sensor 1 is in the transient range.

The slope comparing step is for causing the transient change determining unit 7 to compare the threshold stored in the threshold storing step with the slope ΔVm/Δt calculated in the slope calculating step. The threshold is the slope ΔVm/Δt of the monitoring output value Vm relative to the sampling time t in the rising or falling of the transient range as explained above. Hence, by comparing the threshold with the slope ΔVm/Δt of the monitoring output value Vm in this step during the measurement of the external force F, it is possible to easily determine whether or not the output by the force sensor 1 is in the transient range.

The sensor-output-value correcting step is for causing the transient correcting unit 8 to substitute the sampling time t into the function associated with the threshold based on the comparison result in the slope comparing step, and to add or subtract the obtained value to or from the sensor output value Vs, thereby correcting the sensor output value Vs. In this step, when the comparison result to the effect that the output by the force sensor 1 is in the transient range is output in the slope comparing step, the sampling time t is substituted in the function associated with the threshold in order to generate a correction value. The sampling time t in this step is the sampling time t of the sensor output value Vs at the time point of performing correction. By substituting the sampling time t into the variable (x as explained above) of the function obtained beforehand, it is possible to calculate a correction value at the time of the sampling time t. Next, in the sensor-output-value correcting step, the calculated correction value is added or subtracted to or from the sensor output value Vs, thereby eliminating the effect of the environmental temperature from the sensor output value Vs.

Figure 14:
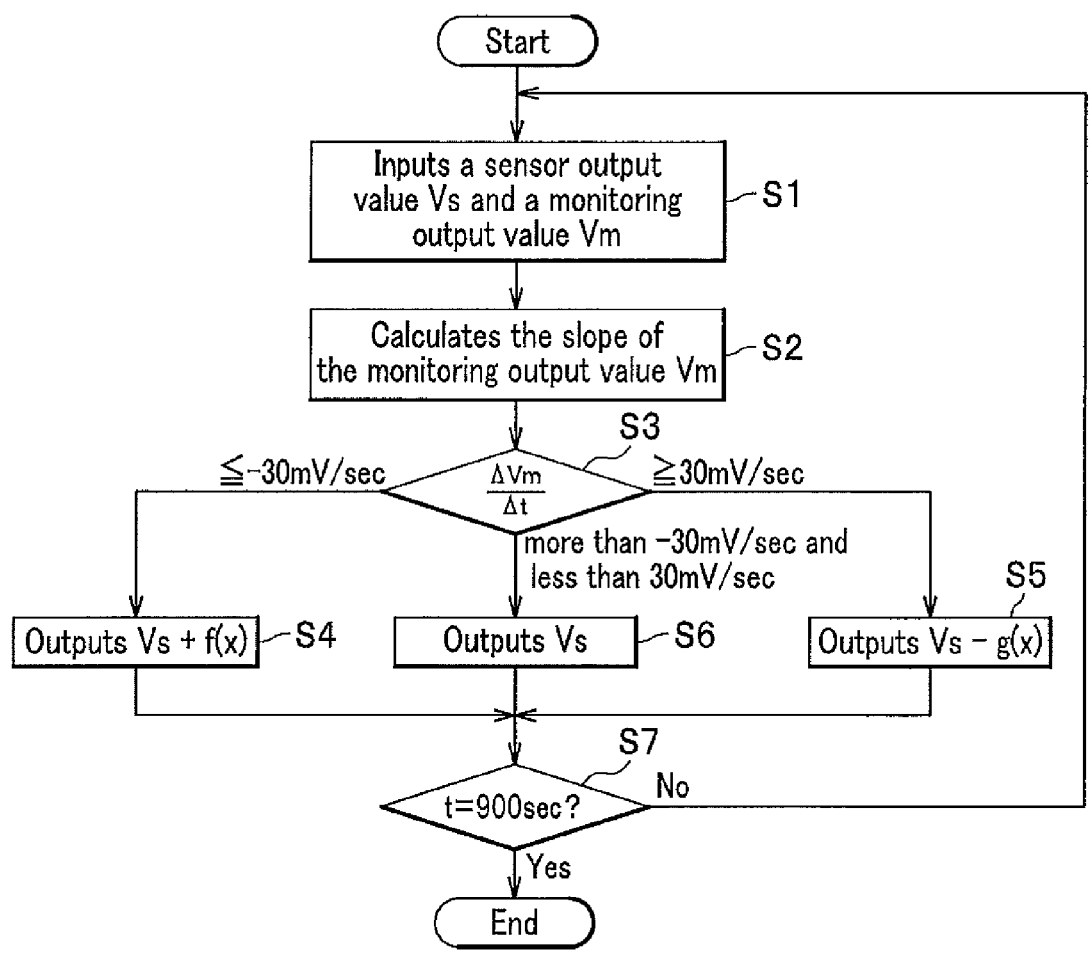
FIG. 14 is a flowchart showing a specific example of a temperature compensation method for a force sensor according to the embodiment.

Next, a detailed explanation will be given of a specific example of the temperature compensation method by the force sensor 1 of this embodiment with reference to FIG. 14. In the following specific example, the process in the above-explained preparation step will be omitted. However, it is presumed in the threshold storing step of the preparation step that two thresholds: −30 mV/sec and 30 mV/sec are set, and in the function storing step, two functions: f(x) and g(x) are calculated and stored in the memory 6 in association with each other. The threshold −30 mV/sec is an expected slope ΔVm/Δt of the falling of the transient range in the case of rapid cooling shown in FIG. 19C, and the threshold 30 mV/sec is an expected slope ΔVm/Δt of the rising of the transient range in the case of rapid heating shown in FIG. 19B.

First, when the force sensor 1 starts measuring the external force F, the sensor output value Vs detected by the sensor-output-value detecting unit 11 and the monitoring output value Vm detected by the monitoring-output-value detecting unit 12 are input in the temperature compensation unit 4 in a step S1. Next, in a step S2, the monitoring resistance-change calculating unit 5 of the temperature compensation unit 4 calculates the slope ΔVm/Δt of the monitoring output value Vm.

Next, it is determined in a step S3 whether or not the slope ΔVm/Δt of the monitoring output value Vm is equal to or less than −30 mV/sec, is equal to or larger than 30 mV/sec, or is larger than −30 mV/sec but is less than 30 mV/sec.

When the slope ΔVm/Δt of the monitoring output value Vm is equal to or less than −30 mV/sec (step S3: a downward arrow), the output by the force sensor 1 is in the transient range because of rapid cooling, so that the process progresses to a step S4, temperature compensation is performed by adding the function f(x) to the sensor output value Vs, thereby calculating the sensor output value V′s. At this time, the sampling time t of the sensor output value Vs at the time of performing correction is substituted in the variable x of the function f(x).

When the slope ΔVm/Δt of the monitoring output value Vm is equal to or larger than 30 mV/sec (step S3: a rightward arrow), the output by the force sensor 1 is in the transient range because of rapid heating, so that the process progresses to a step S5, temperature compensation is performed by subtracting the function g(x) from the sensor output value Vs, thereby calculating the sensor output value V′s. At this time, the sampling time t of the sensor output value Vm at the time of performing correction is substituted in the variable x of the function g(x).

When the slope ΔVm/Δt of the monitoring output value Vm is larger than −30 mV/sec but is less than 30 mV/sec (step S3: a downward arrow), the output by the force sensor 1 is in a steady range where the output is stable, so that the process progresses to a step S6, and the sensor output value Vs is output as it is without any temperature compensation.

Next, an explanation will be given of a modified example of the force sensor 1 according to this embodiment. The force sensor of the modified example causes the temperature compensation unit 4 to perform temperature compensation through a hardware processing prior to the software processing. The force sensor and the force sensor chip of the modified example have the same configurations as those of the above-explained force sensor 1 and the force sensor chip 2 except the temperature compensation unit 4, so that detailed explanation of each configuration will be omitted.

The force sensor of the modified example performs temperature compensation through the primary hardware processing as follows.

Figure 15A:
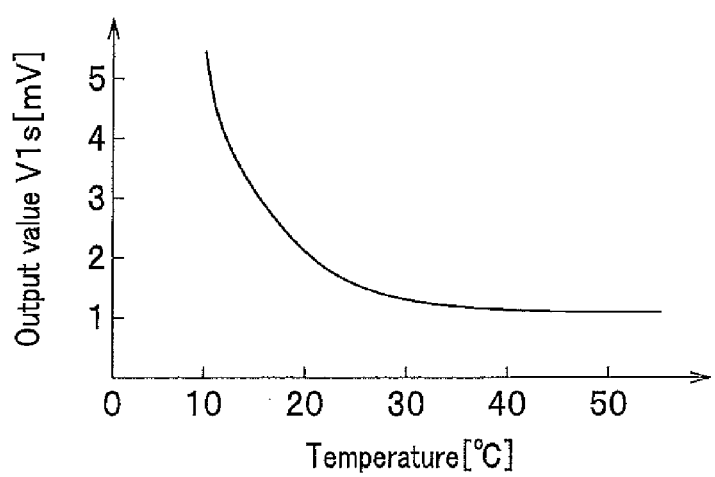
FIG. 15A is a diagram for explaining a temperature compensation by a first-stage hardware process in a force sensor chip according to another embodiment, and is a graph showing a change in a sensor output value V1$s$ relative to a temperature.

First, before the measurement of the external force F by the force sensor, a sensor output value V1s of the strain detecting resistive element S when only a chip temperature without an application of the external force F, i.e., only the environmental temperature is changed is measured beforehand. As shown in FIG. 5 or 6, the sensor output value V1s is a value calculated by inputting respective resistance changes of the strain detecting resistive element S and the temperature-compensation resistive element 24 of the bridge circuit BC1 into the AD converter 40 through the LPF 41. Also, the sensor output value V1s is an output value by the strain detecting resistive element S corresponding to the change in the environmental temperature, and the relationship thereof with the chip temperature is like one shown in FIG. 15A.

Figure 15B:
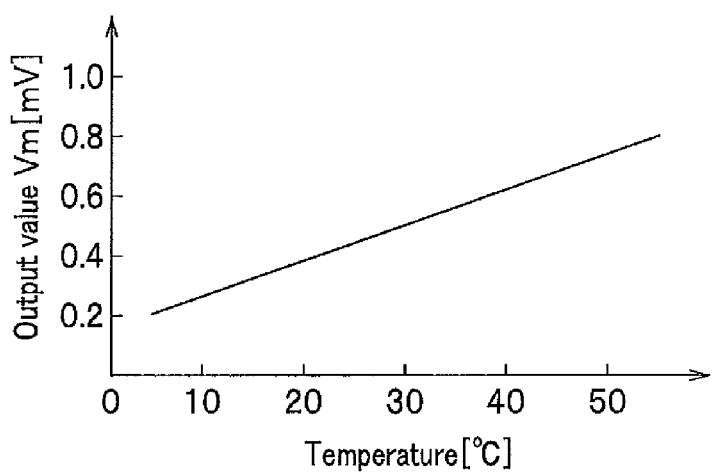
FIG. 15B is a diagram for explaining a temperature compensation by a first-stage hardware process in a force sensor chip according to another embodiment, and is a graph showing a change in a monitoring output value Vm relative to a temperature.

At the same time, before the measurement of the external force F by the force sensor, a monitoring output value Vm of the monitoring resistive element 24a when only the chip temperature, i.e., only the environmental temperature is changed is measured beforehand. As shown in FIG. 5 or 6, the monitoring output value Vm is a value calculated by inputting the resistance change of the monitoring resistive element 24a of the bridge circuit BC2 into the AD converter 40 through the LPF 41. Also, the monitoring output value Vm is an output value by the monitoring resistive element 24a corresponding to a change in the environmental temperature, and the relationship thereof with the environmental temperature is like one shown in FIG. 15B.

Figure 15C:
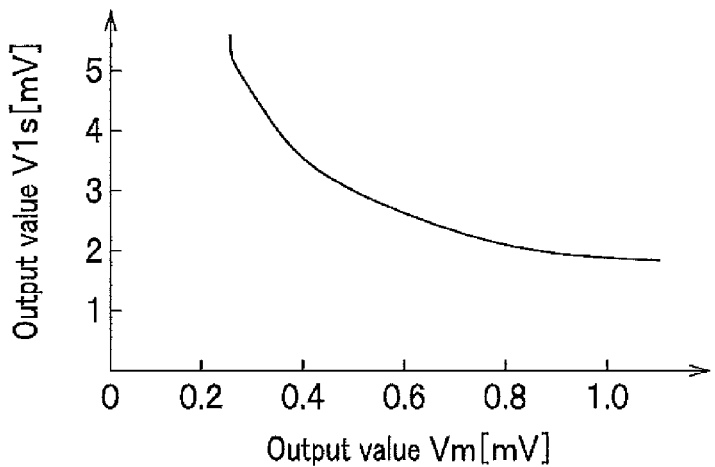
FIG. 15C is a diagram for explaining a temperature compensation by a first-stage hardware process in a force sensor chip according to another embodiment, and is a graph showing a change in a sensor output value V1$s$ relative to a monitoring output value Vm.

The force sensor of the modified example sets the sensor output value V1s and the monitoring output value Vm to be a function like one shown in FIG. 15C, and stores the function (e.g., y=f(m)) into the memory 6 or the like of the temperature compensation unit 4 beforehand. The m of the function is a variable of the monitoring output value Vm, and by substituting the monitoring output value Vm into m, the sensor output value V1s that is a specific value of the function can be obtained. The specific value obtained by substituting the monitoring output value Vm into the variable m of the function in this fashion is used as a correction value for performing temperature compensation on the sensor output value Vs detected at the sampling time t which is the same time as that of the monitoring output value Vm as will be discussed later. The function between the sensor output value V1s and the monitoring output value Vm indicates a varying pattern of the sensor output value originating from the varying of the environmental temperature.

When starting measuring the external force F, the force sensor of the modified example causes the bridge circuit BC1 to input respective resistance changes of the strain detecting resistive element S and the temperature-compensation resistive element 24 into the AD converter 40 through the LPF 41, and the sensor output value Vs is calculated. The sensor output value Vs is an output value including not only the external force F but also the effect of the environmental temperature. An example of the effect of the environmental temperature is the varying of the chip temperature generated by a temperature disturbance input after the sensor is assembled.

The force sensor of the modified example substitutes the monitoring output value Vm calculated at the same sampling time t as that of the sensor output value Vs into the variable m of the function, and calculates the sensor output value V1s that is a correction value. By subtracting the sensor output value V1s from the sensor output value Vs, temperature compensation is performed. In this fashion, by subtracting the sensor output value V1s including only the effect of the environmental temperature from the sensor output value Vs including both effect of the external force F and effect of the environmental temperature, it is possible to calculate a sensor output value V2s (not illustrated) including only the effect of the external force F.

The sensor output value V2s can be subjected to temperature compensation in the steady range which is shown in the right of each hatched region in each of FIGS. 19A, 19B, and 19C, but in the transient range shown in the left of each hatched region in each of FIGS. 19A, 19B, and 19C, calculation of such a sensor output value is difficult in some cases. Hence, the force sensor of the modified example performs temperature compensation (see FIG. 5) through the software processing as a following temperature compensation simultaneously with the temperature compensation through the hardware processing as the primary temperature compensation. Accordingly, the force sensor of the modified example performs temperature compensation at two stages: primary and following temperature compensations, and can compensate the varying of the sensor output value Vs originating from the environmental temperature in the steady range and in the transient range more appropriately.

Figure 16:
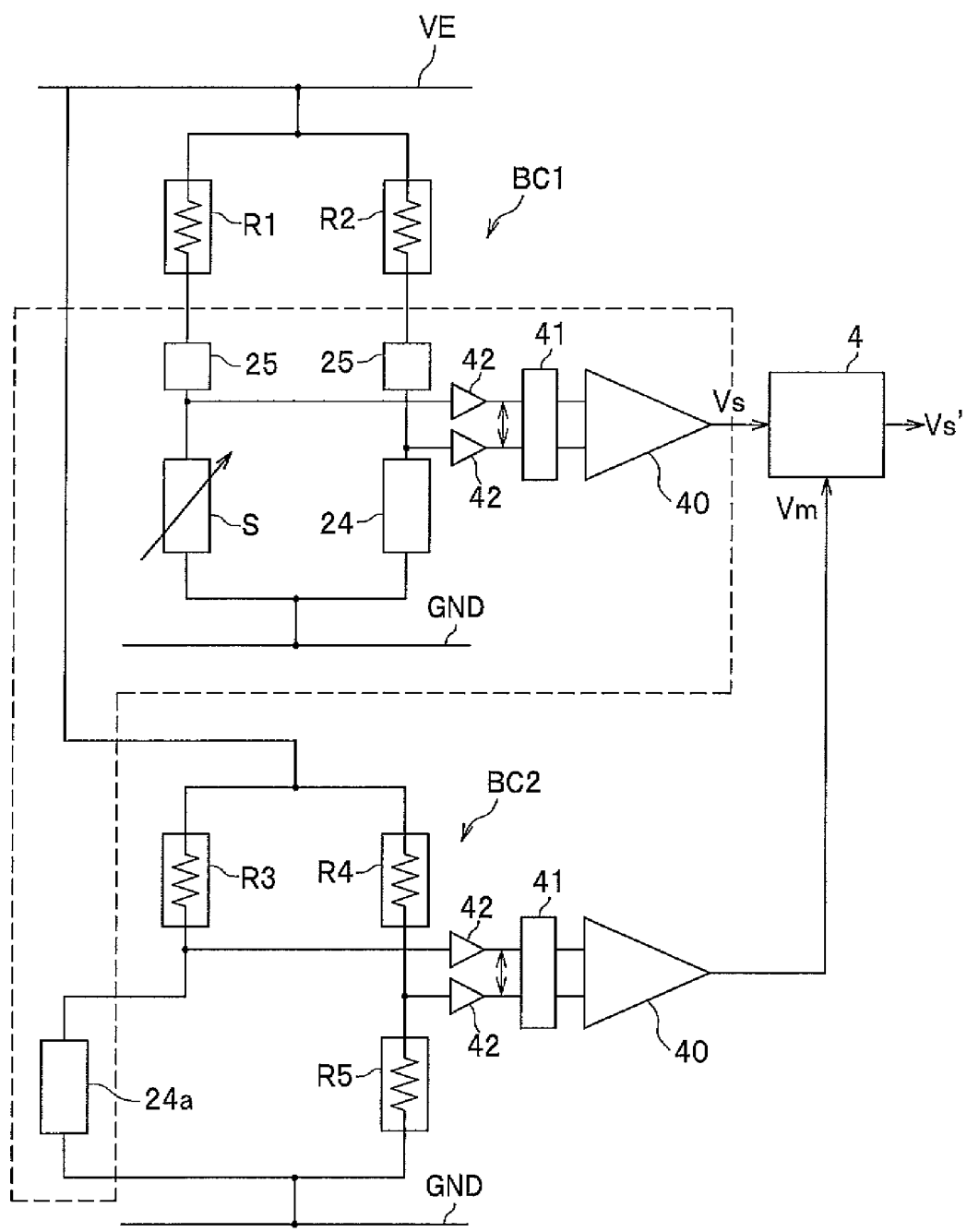
FIG. 16 is a circuit diagram showing an electrical connection when an LPF and an AD converter are built in the chip of the force sensor chip according to a modified example of another embodiment, and is a diagram showing a circuit added with buffer amplifiers.
Figure 17:
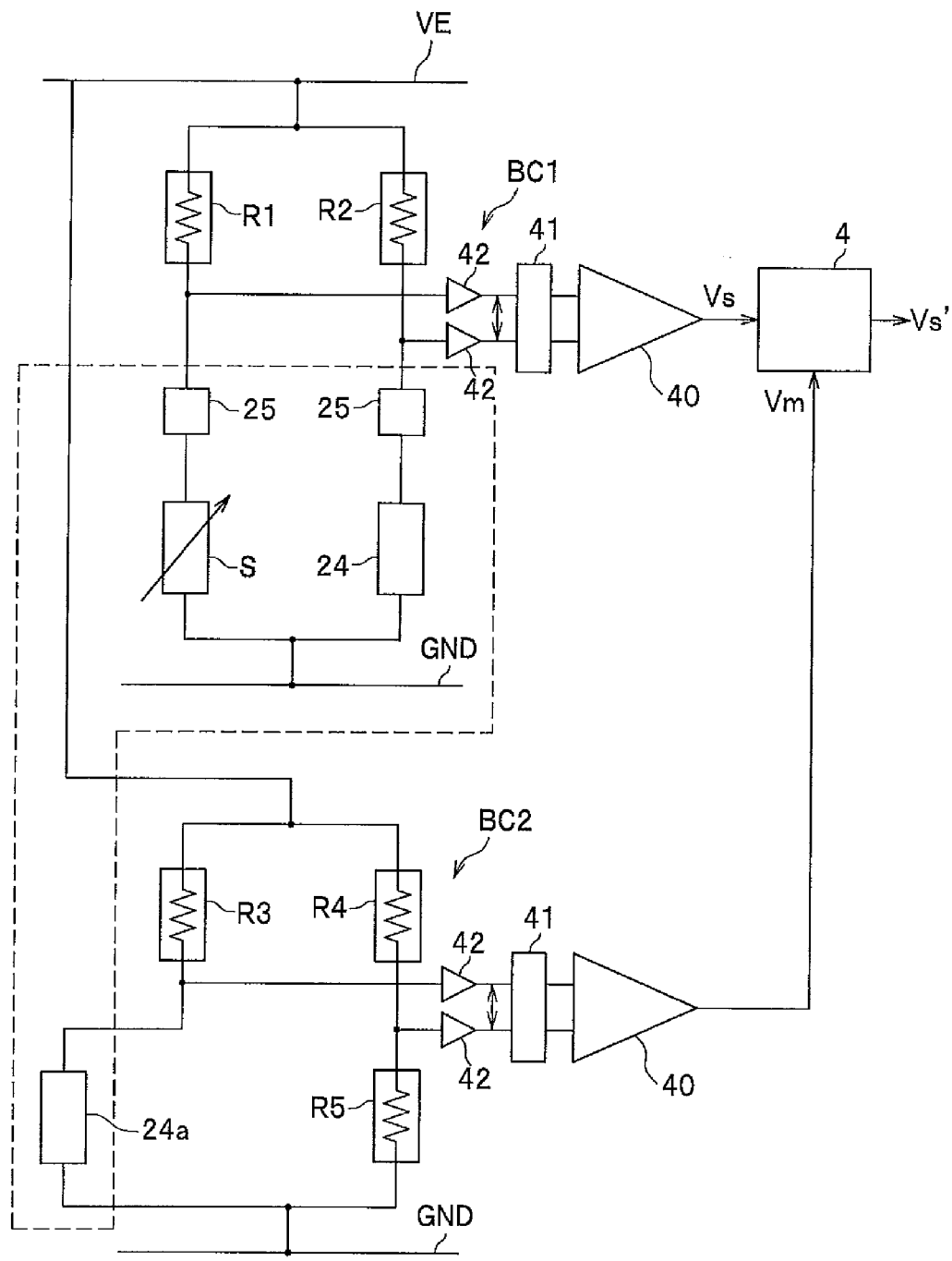
FIG. 17 is a circuit diagram showing an electrical connection when an LPF and an AD converter are provided outside the chip of the force sensor chip according to a modified example of another embodiment, and is a diagram showing a circuit added with buffer amplifiers.

Next, an explanation will be given of a modified example of the force sensor chip 2 with reference to the circuit diagrams of FIGS. 16 and 17. The force sensor chip of the modified example has the circuit configuration of FIG. 6 and FIG. 7 added with buffer amplifiers 42 as shown in FIGS. 16 and 17. Accordingly, the same structural element as that of the circuit diagram shown in FIG. 6 and FIG. 7 will be denoted by the same reference numeral, and the duplicated explanation thereof will be omitted. FIG. 16 is a circuit diagram showing the AD converter 40, the LPF 41, and the buffer amplifier 42 built in the chip, and FIG. 17 is a circuit diagram showing the AD converter 40, the LPF 41 and the buffer amplifier 42 provided outside the chip.

The buffer amplifier 42 converts the high impedance of the strain detecting signal into low impedance, thereby suppressing effects of noises. As shown in FIGS. 16 and 17, the buffer amplifiers 42 are connected between the strain detecting resistive element S and the $\Delta\Sigma$AD converter 40 and the temperature-compensation resistive element 24 and such a converter. By having such a buffer amplifier 42, the force sensor chip 2 can suppress effects of noises, and can detect the external force F applied to the action portion 21 more precisely.

Also, the force sensor chip 2 explained above has the strain detecting resistive elements S, etc., arranged on the front face of the sensor, but the strain detecting resistive elements S, etc., may be additionally stacked on the rear face of the sensor, and the external force F may be detected through the strain detecting resistive elements S on both surfaces. In this case, the strain detecting resistive element S on the rear face employs the same configuration as one shown in FIGS. 3 and 4. By providing the strain detecting resistive elements S on both surfaces of the force sensor chip 2, it is possible to detect external forces F applied to both surfaces.

Next, a detailed explanation will be given of an acceleration sensor chip 200 having the temperature compensation unit 4 with reference to FIG. 18. The acceleration sensor measures accelerations in respective three axes (X axis, Y axis, and Z axis) orthogonal to one another using resistive elements, and the acceleration sensor chip 200 bears the sensor function thereof.

Figure 18:
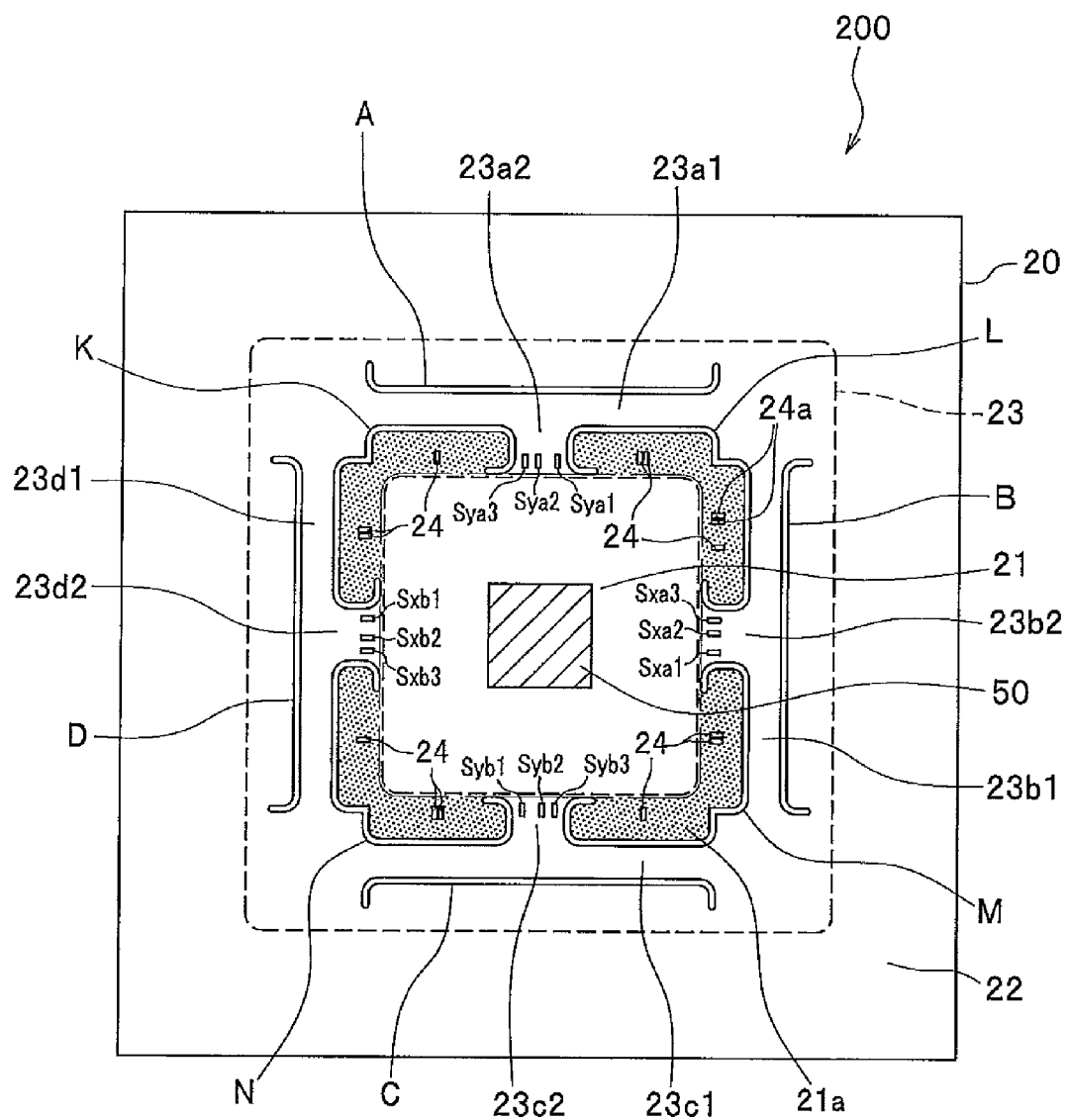
FIG. 18 is a plan view showing a whole configuration of an acceleration sensor chip provided with a temperature-compensation unit.

As shown in FIG. 18, the acceleration sensor chip 200 has the same configuration as that of the force sensor chip 2 except that the action portion 21 is provided with a weight 50. Accordingly, the same structural element as that of the force sensor chip 2 will be denoted by the same reference numeral, and the duplicated explanation thereof will be omitted. Also, the acceleration sensor chip 200 has the same strain detecting resistive elements, wiring condition (see FIG. 4) thereof, and circuit diagram (see FIG. 6) showing the electrical connection thereof as those of the force sensor chip 2, so that the duplicated explanation thereof will be also omitted.

The weight 50 is caused to be displaced originating from an acceleration of the action portion 21. As shown in FIG. 16, the weight 50 is arranged at the center of the action portion 21, and is formed in a square shape. The specific arrangement location of the weight 50 is not limited to any particular one as long as the action portion 21 is capable of displacing at a predetermined acceleration, and for example, the weight 50 may be arranged at the bottom of the action portion 21 (see FIG. 3). The weight 50 comprises, for example, a plate like a glass plate.

When an external force F with an acceleration is applied to the action portion 21 of the acceleration sensor chip 200 having the above-explained configuration, the strain detecting resistive elements S deform at a predetermined acceleration, and respective resistance values change. Changes in respective output voltages by the strain detecting resistive elements S are detected from the changes in respective resistance values, and the magnitude of the acceleration is measured.

The acceleration sensor chip 200 has the temperature compensation unit 4 (see FIG. 5) like the force sensor chip 2 explained above. Accordingly, the acceleration sensor having such an acceleration sensor chip 200 causes the temperature compensation unit 4 to obtain and hold the pattern of a monitoring output value Vm in the transient range as a threshold and a function before measuring an acceleration. Next, the acceleration sensor compares the threshold obtained beforehand with a monitoring output value Vm during measurement of the external force F, and determines whether or not the monitoring output value Vm is in the transient range. When determining that the monitoring output value Vm is in the transient range, the acceleration sensor substitutes the sampling time t into the function associated with the threshold in order to obtain a correction value, and adds or subtracts the correction value to or from a sensor output value Vs, thereby correcting the sensor output value Vs.

That is, the acceleration sensor having the acceleration sensor chip 200 determines, during measurement of an acceleration, whether or not the output thereof is in the transient range based on a slope $\Delta Vm/\Delta t$ of the monitoring output value Vm with reference to the threshold stored beforehand, and estimates the specific pattern of the transient range and a correction value based on the function stored in association with the threshold beforehand, thereby correcting the sensor output value Vs. Accordingly, the acceleration sensor having the acceleration sensor chip 200 can eliminate the effect of the environmental temperature from the sensor output value Vs through a software processing in not only the steady range but also the transient range, thereby measuring a true acceleration.

What is claimed is:

1. A temperature compensation method for a force sensor, the method performing temperature compensation on the force sensor by eliminating an effect of an environmental temperature from a sensor output value that indicates an output value by the force sensor in a transient range where an output by the force sensor is unstable or in a steady range where the output is stable, and the method comprising:
    a preparation step of obtaining a varying pattern of the environmental temperature in the transient range before the force sensor measures an external force, wherein the preparation step includes:
        a first monitoring-output-value detecting step of causing a monitoring-output-value detecting unit to detect a monitoring output value indicating the environmental temperature at a predetermined sampling cycle;
        a threshold storing step of causing a monitoring resistance-change calculating unit to calculate a slope of the monitoring output value relative to a sampling time in a rising or falling of the transient range, and to store the slope as a threshold in a memory; and
        a function storing step of causing the monitoring resistance-change calculating unit to calculate a function representing a change in the monitoring output value in the transient range together with time, and to store the calculated function in the memory in association with the threshold; and
    a correction step of estimating the varying pattern from the environmental temperature while the force sensor is measuring the external force, and of correcting the sensor output value using a correction value based on the estimated varying pattern, wherein the correction step includes:
        a sensor-output-value detecting step of causing a sensor-output-value detecting unit to detect the sensor output value in the transient range or in the steady range at the predetermined sampling cycle;
        a second monitoring-output-value detecting step of causing the monitoring-output-value detecting unit to detect the monitoring output value in the transient range or in the steady range at the predetermined sampling cycle;
        a slope calculating step of causing the monitoring resistance-change calculating unit to calculate a slope of the monitoring output value relative to the sampling time;
        a slope comparing step of causing a transient change determining unit to compare the threshold stored in the threshold storing step with the slope calculated in the slope calculating step; and
        a sensor-output-value correcting step of causing a transient correcting unit to substitute the sampling time into the function associated with the threshold based on a comparison result by the slope comparing step, and to add or subtract an obtained correction value to or from the sensor output value, thereby correcting the sensor output value.

2. A force sensor that measures an external force, the force sensor comprising:
    a force sensor chip that detects the external force based on a change in a resistance value of a strain detecting resistive element in accordance with a magnitude of the external force, wherein the force sensor chip includes:
        a base member that includes:
            an action portion where the external force is applied;
            a support portion in a frame shape that supports the action portion therearound; and
            a connecting portion that connects the action portion and the support portion together,
        a plurality of strain detecting resistive elements that are formed at respective connected portions between the action portion and the connecting portion; and
        a monitoring resistive element which is arranged in the vicinity of the strain detecting resistive element and which detects a monitoring output value indicating the environmental temperature in the transient range or in the steady range at a predetermined sampling cycle; and
    a temperature compensation unit that eliminates an effect of an environmental temperature from a sensor output value which indicates an output value by the force sensor in a transient range where an output by the force sensor is unstable or in a steady range where the output is stable, wherein the temperature compensation unit obtains a varying pattern of the environmental temperature in the transient range before the force sensor is measuring the external force, estimates the varying pattern from the environmental temperature while the force sensor is measuring the external force, corrects the sensor output value using a correction value based on the estimated varying pattern, stores, as a threshold, a slope of the monitoring output value in a rising or falling of the transient range before the force sensor measures the external force in a memory, calculates a function representing a change in the monitoring output value in the transient range together with time, and stores the calculated function in the memory in association with the threshold,
    the temperature compensation unit including:
    a monitoring resistance-change calculating unit that calculates a slope of the monitoring output value relative to a sampling time in the transient range or in the steady range while the force sensor is measuring the external force;
    a transient change determining unit that compares the threshold stored in the memory before the force sensor measures the external force with the slope calculated while the force sensor is measuring the external force; and a transient correcting unit which substitutes the sampling time into the function associated with the threshold based on a comparison result by the transient change determining unit, and adds or subtracts an obtained correction value to or from the sensor output value, thereby correcting the sensor output value.

3. The force sensor according to claim 2, wherein
the connecting portion includes a T-shaped beam region with an elastic portion and a bridge portion, and
the T-shaped beam region is formed so as to be symmetrical at four locations around a center of the action portion.

4. The force sensor according to claim 2, wherein the action portion, the support portion, and the connecting portion are functionally separated from one another by a first through-hole.

5. The force sensor according to claim 3, wherein the action portion, the support portion, and the connecting portion are functionally separated from one another by a first through-hole.

6. The force sensor according to claim 2, wherein the elastic portion has a smaller rigidity than the bridge portion.

7. The force sensor according to claim 3, wherein the elastic portion has a smaller rigidity than the bridge portion.

8. The force sensor according to claim 4, wherein the elastic portion has a smaller rigidity than the bridge portion.

9. The force sensor according to claim 5, wherein the elastic portion has a smaller rigidity than the bridge portion.

10. The force sensor according to claim 2, wherein the region with a high rigidity and the region with a small rigidity are functionally separated by a second through-hole.

11. The force sensor according to claim 3, wherein the region with a high rigidity and the region with a small rigidity are functionally separated by a second through-hole.

12. The force sensor according to claim 4, wherein the region with a high rigidity and the region with a small rigidity are functionally separated by a second through-hole.

13. The force sensor according to claim 5, wherein the region with a high rigidity and the region with a small rigidity are functionally separated by a second through-hole.

14. The force sensor according to claim 6, wherein the region with a high rigidity and the region with a small rigidity are functionally separated by a second through-hole.

15. The force sensor according to claim 7, wherein the region with a high rigidity and the region with a small rigidity are functionally separated by a second through-hole.

16. The force sensor according to claim 8, wherein the region with a high rigidity and the region with a small rigidity are functionally separated by a second through-hole.

17. The force sensor according to claim 9, wherein the region with a high rigidity and the region with a small rigidity are functionally separated by a second through-hole.

* * * * *